United States Patent
Wu et al.

(10) Patent No.: US 11,971,249 B1
(45) Date of Patent: Apr. 30, 2024

(54) OPTICAL PARALLELISM SYSTEM FOR EXTENDED REALITY METROLOGY

(71) Applicant: MLOptic Corp, Redmond, WA (US)

(72) Inventors: Pengfei Wu, Bellevue, WA (US); Ying-Ju Chu, Redmond, WA (US); Sean Huentelman, Bellevue, WA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 18/385,035

(22) Filed: Oct. 30, 2023

(51) Int. Cl.
*G01B 11/27* (2006.01)
*G06T 7/62* (2017.01)

(52) U.S. Cl.
CPC .............. *G01B 11/272* (2013.01); *G06T 7/62* (2017.01)

(58) Field of Classification Search
CPC ................................ G01B 11/272; G06T 7/62
USPC ........................................................ 356/138
See application file for complete search history.

(56) References Cited

U.S. PATENT DOCUMENTS

2018/0058814 A1* 3/2018 Guthrie .................. F41G 3/165

FOREIGN PATENT DOCUMENTS

| CN | 112083020 A | * 12/2020 | ........... G01N 23/083 |
| JP | H11344677 A | * 12/1999 | |

* cited by examiner

*Primary Examiner* — Michael A Lyons
*Assistant Examiner* — Omar H Nixon
(74) *Attorney, Agent, or Firm* — Jong Patent Firm; Cheng Ning Jong; Tracy P. Jong

(57) ABSTRACT

An optical system including an enclosure including a front end and a rear end, a first pair of apertures configured to be disposed on a front plane on the front end of the enclosure and a single optical lens system disposed between the front end and the rear end of the enclosure, wherein the first pair of apertures are configured to allow sets of light rays into the enclosure through the single optical lens system to be cast on an image plane as first and second spots, the image plane being parallel to the front plane, if the first and second spots are concentrically disposed, the sets of light rays are determined to be parallelly disposed with respect to one another, otherwise the sets of light rays are determined to not be parallelly disposed with one another.

9 Claims, 29 Drawing Sheets

25 mm width
optical lens system

Optical Data

| Surface # | Radius of curvature (mm) | Thickness (mm) | Refractive index | Abbe number | Lens elements |
|---|---|---|---|---|---|
| 0 | Infinity | VID | | | Object |
| 1 | Infinity | 0.000 | | | Coordinate Break |
| 2 | Infinity | 0.000 | | | Stop |
| 3 | Infinity | 50.000 | | | Coordinate Break |
| 4 (A1) | -830.666 | 8.799 | 1.569 | 71.304 | Singlet |
| 5 (A2) | -82.886 | 13.746 | | | |
| 6 (B1) | -35.391 | 7.075 | 1.755 | 52.322 | Doublet |
| 7 (B2) | -60.124 | 8.959 | 1.569 | 71.304 | |
| 8 (B3) | -39.698 | 34.918 | | | |
| 9 (C1) | 279.087 | 12.178 | 1.569 | 71.304 | Doublet |
| 10 (C2) | -40.000 | 0.990 | 1.755 | 52.322 | |
| 11 (C3) | 141.530 | 12.594 | | | |
| 12 (D1) | 136.694 | 10.794 | 1.569 | 71.304 | Singlet |
| 13 (D2) | -82.491 | 230.046 | | | |
| 14 | Infinity | 0.000 | | | Image |

FIG. 8

| Apertures (in diameter) | 5 mm | 4 mm | 3 mm | 2 mm |
|---|---|---|---|---|
| Interpupillary distance (IPD) | 25 mm | 25 mm | 25 mm | 25 mm |
| Virtual image distance (VID) range | from -6D to +6D | from -7D to +6D | from -7D to +6D | from -8D to +6D |

*FIG. 9*

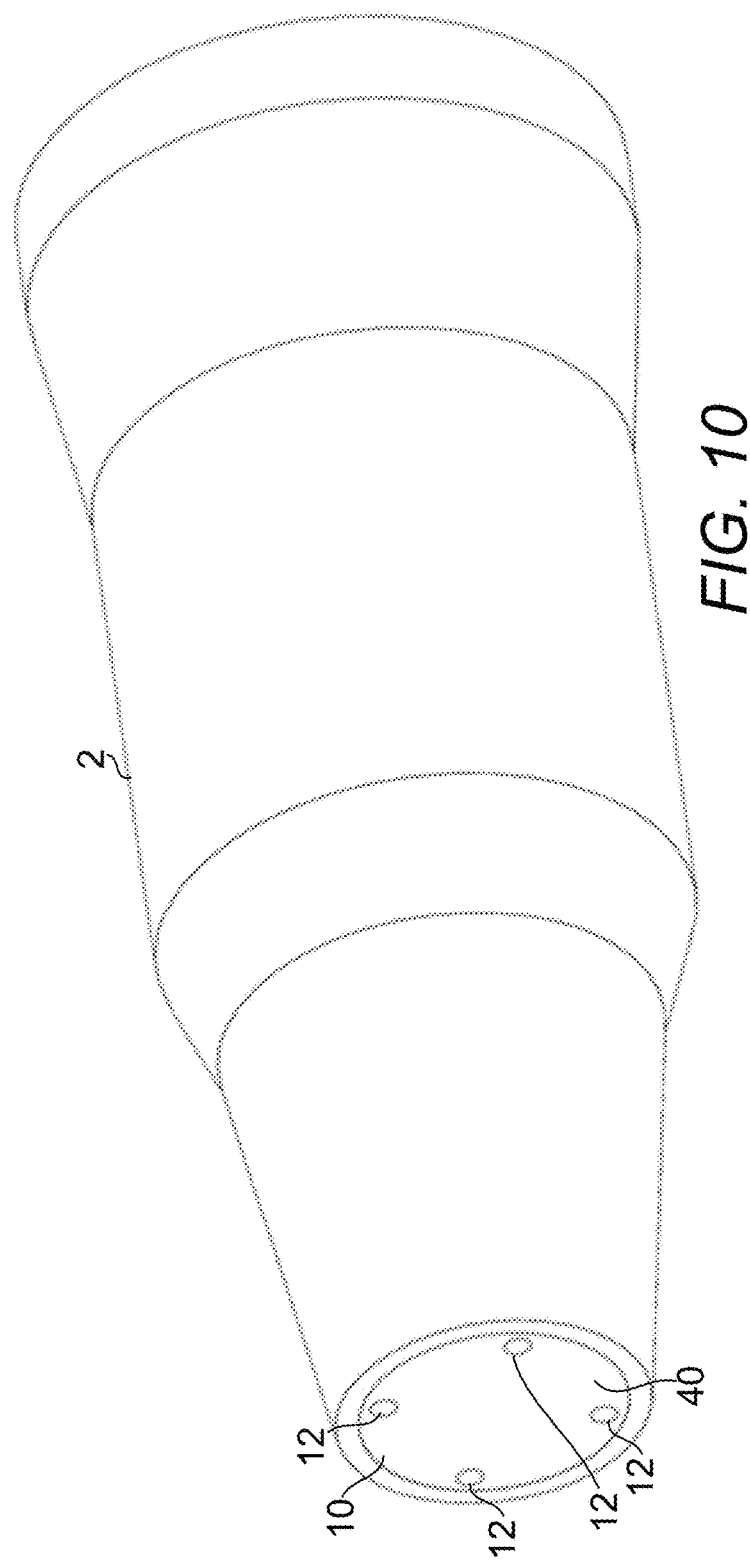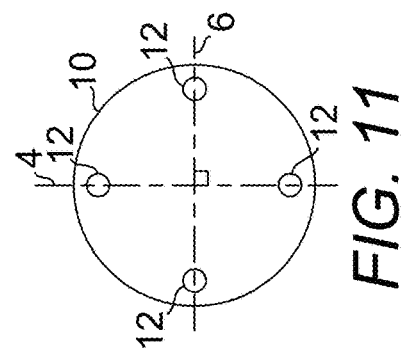

| VID | -6D | -4D | -2D | -1D | 0D | 1D | 2D | 4D | 6D |
|---|---|---|---|---|---|---|---|---|---|
| (mm) | 166.67 | 250 | 500 | 1000 | Infinity | -1000 | -500 | -250 | -166.67 |
| Image Semi-Dia (mm) | 6.046915 | 6.047758 | 6.025869 | 6.009931 | 5.990610 | 5.977550 | 5.960923 | 5.915485 | 5.874174 |

FIG. 12A

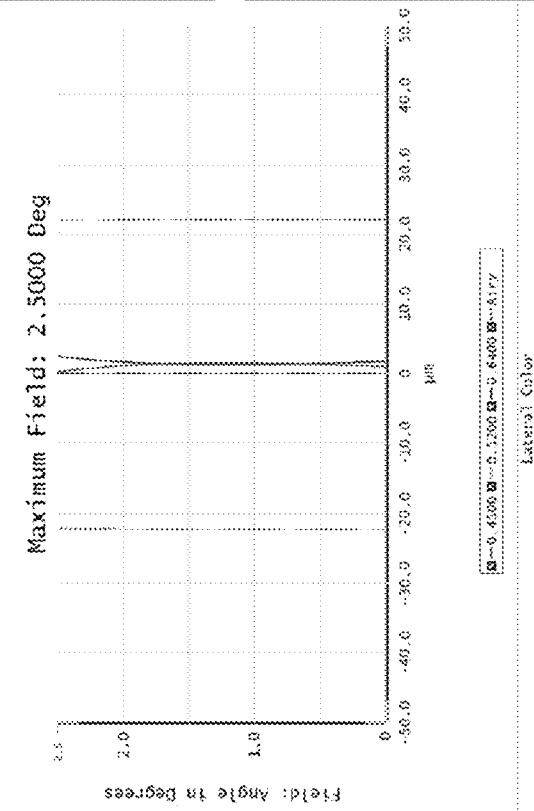
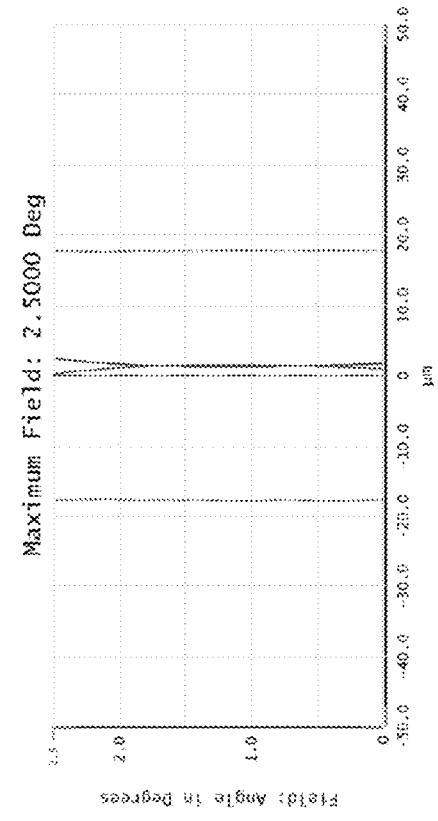
FIG. 27

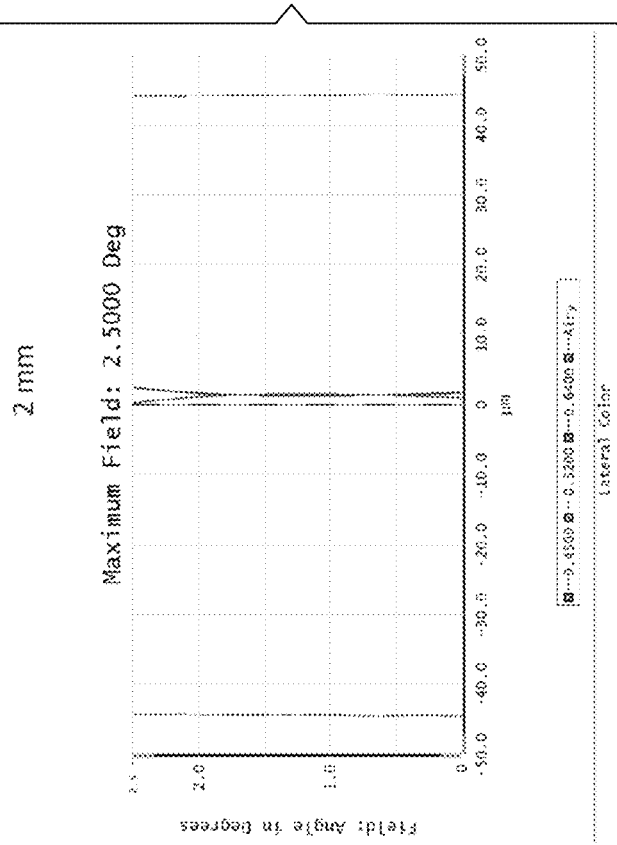
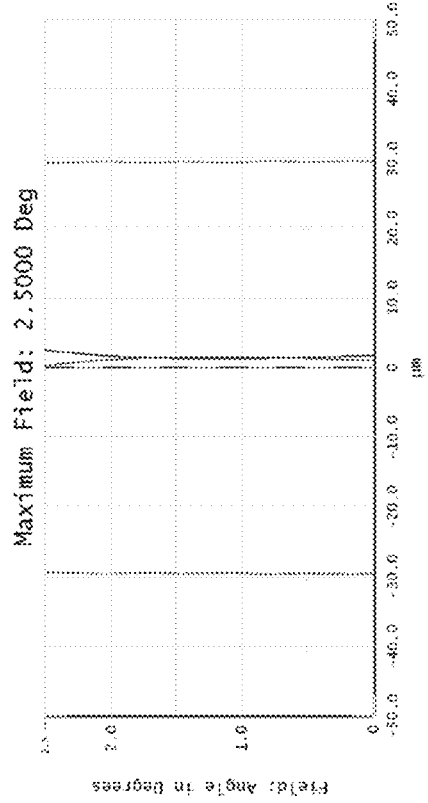
FIG. 28

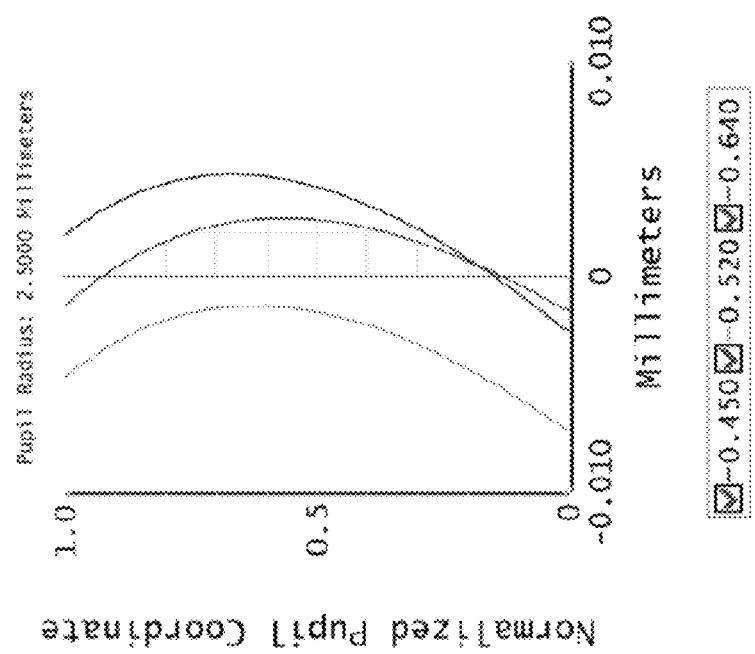
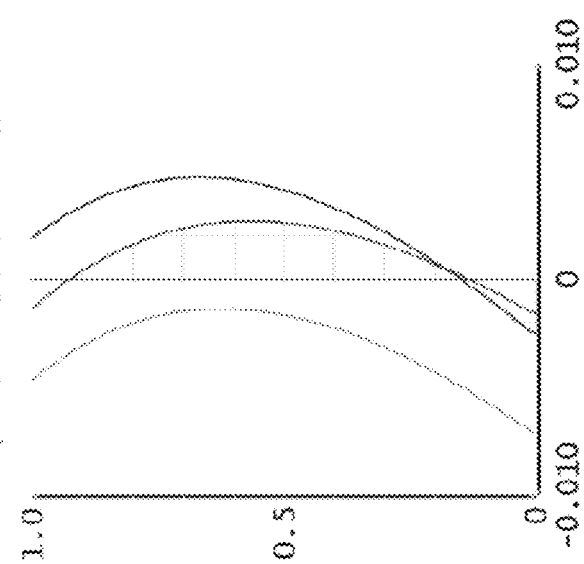
FIG. 29

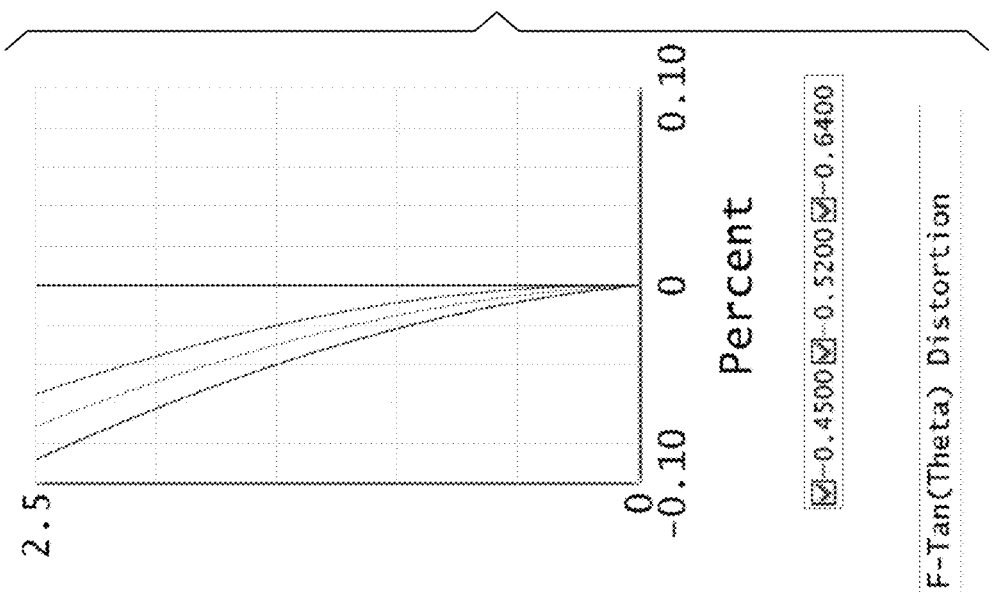
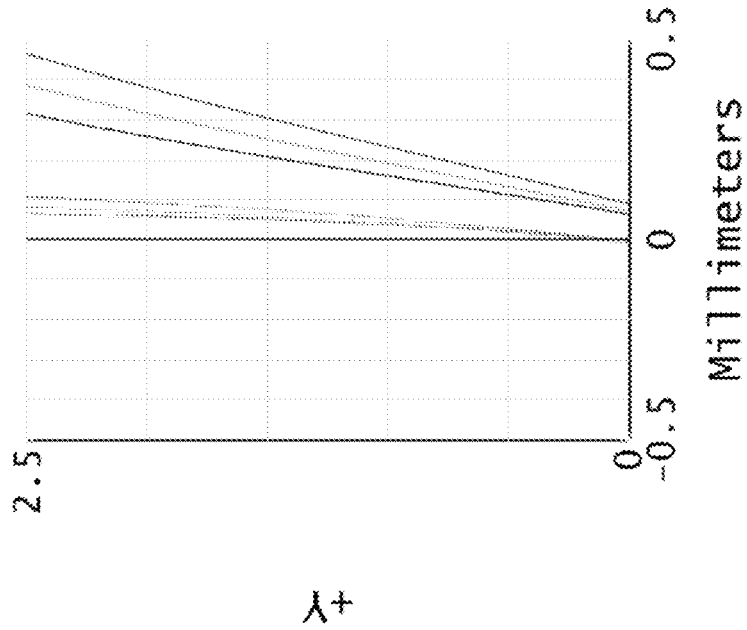
FIG. 30

OPTICAL PARALLELISM SYSTEM FOR EXTENDED REALITY METROLOGY

1. THE FIELD OF THE INVENTION

The present invention relates to an apparatus useful for measuring optical parallelism in extended reality (XR) metrology. More specifically, the present invention is directed to an apparatus useful for measuring optical parallelism in XR metrology using a single optical lens system.

2. BACKGROUND ART

Optical parallelism refers to the consistent alignment of optical rays from the same field angle to reach a user's eyes. It is extremely critical to maintain parallelism or consistency of optical rays within extended reality (XR), e.g., augmented reality (AR) and virtual reality (VR), devices to ensure that virtual elements or information presented to the user through XR technology align correctly with the real world, creating a seamless and immersive experience. In addition, optical parallelism can significantly impact the optical imaging quality of XR devices as inconsistent rays can blur the ideal optical spot that is supported to be formed in the human eye.

There are several XR application examples where optical parallelism is significant. In calibration and alignment, XR devices need to be accurately calibrated to ensure that the virtual content aligns correctly with the user's field of view, depth perception, and physical environment. Maintaining optical ray parallelism is a prerequisite to enable precise alignment of the virtual scene's rays with the user's actual visual perception. This involves a combination of precise calibration, alignment, accurate tracking and rendering techniques. In waveguide and optical systems, many XR devices use waveguides, holographic gratings or other optical components to guide and project light onto the user's eyes. Maintaining parallelism within these optical systems is essential to avoid distortions, aberrations or misalignments that could disrupt the XR experience. In optical sensors and tracking, optical ray parallelism can also relate to the tracking and sensing systems used in XR devices. These systems monitor the user's movements and adjust the virtual content in real time. A consistent and responsive XR experience can be maintained by ensuring that the virtual rays remain parallel to the user's physical perspective. In the field of displays, parallel optical rays contribute to the overall image quality and clarity of an XR display. Misaligned rays can lead to distortions, aberrations, and reduced image sharpness. By preserving parallelism, XR devices can deliver high-quality visual contents. In an effective overlay of information, many XR applications involve overlaying digital information onto the user's view of the physical world. Parallel optical rays ensure that this overlay is accurate and properly aligned, enabling users to access information in a contextually relevant and intuitive manner. In XR applications and use cases, parallel optical rays are especially critical for XR applications where precise alignment is essential, e.g., medical visualization, industrial maintenance, architectural design and navigation assistance. In these contexts, misalignment could lead to serious consequences or errors.

Optical ray parallelism directly contributes to the quality, realism, and usability of the XR experience. Further, when optical rays parallelism is well-maintained, virtual objects appear to interact seamlessly with the real world, enhancing the user's perception of realism. As such, it helps to create a cohesive and natural AR experience, allowing users to perceive virtual objects as if they were part of their physical surroundings. Misalignments or discrepancies between virtual and real rays can break this immersion and disrupt the user's perception. In depth perception and spatial awareness, maintaining parallelism helps to create accurate depth cues and spatial relationships between virtual and real objects. When optical ray parallelism is preserved, virtual objects can appear at correct distances and positions in the field of view, enhancing the user's ability to perceive depth and navigate the XR environment effectively. Misaligned optical rays can lead to visual discomfort, e.g., eye strain, fatigue and even motion sickness. Parallelism in optical rays helps minimize these issues, making the XR experience more comfortable and enjoyable for users, especially during a prolonged use. Many XR applications involve interactions between a user and virtual objects. Parallel optical rays enable precise interactions by ensuring that virtual objects respond accurately to the user's gestures, movements, and actions. This accuracy is crucial for applications, e.g., virtual object manipulation, selection and navigation. XR devices are often used by different individuals with varying physical characteristics, e.g., interpupillary distance (IPD). Maintaining optical ray parallelism accommodates these individual differences, ensuring a consistent and satisfactory experience for a broad range of users. Therefore, optical ray parallelism is a fundamental aspect of XR device design and implementation. It directly impacts user experience, comfort, and the effectiveness of various AR applications. Maintaining parallelism ensures that virtual content aligns accurately with the real world, creating a compelling and valuable XR experience for users.

If a misalignment occurs only between virtual and real-world optical rays, several methods may be used to mitigate the issue of ray parallelism depending on the specific XR devices and the application scenarios. In many cases, a combination of measurements is employed to achieve a consistent alignment between a virtual object and the real world. An example mitigation strategy useful for evaluating and mitigating unsatisfying optical parallelism in XR products includes placing physical markers in the user's environment to serve as alignment references. XR devices can detect these markers and adjust the virtual content to match their positions, helping to achieve better parallelism. In another example, XR devices can be used to virtually display specific calibration patterns that contain known geometric shapes or markers. By analyzing how these patterns align with the user's real-world environment, the device can adjust relevant optical parameters to achieve better parallelism. This method is often used during initial setup or when the user changes his/her environment. In yet another example, advanced XR devices can provide users with tools to manually adjust parameters related to parallelism. For example, users might be able to fine-tune the alignment of virtual content through software interfaces. In yet another example, some XR devices are designed to autonomously calibrate and adjust their optical parameters based on sensors and algorithms, periodically ensuring that ray parallelism is maintained. However, the above methods are only useful for the XR products with advanced features and not suitable for assessments in development and production stages, e.g., measurements of ray angular deviation during prototyping and manufacturing XR components, subsystems as well as full systems. The above methods also require that the products to be equipped with adjustable features and advanced algorithms for compensation of the misalignment of optical parallelism between the virtual and real world. These methods are incapable in ascertaining and resolving the fundamental causes of optical parallelism issues from the XR components and assembling processes.

In optics, a ray is a simplification used to represent the path that light follows. Ray tracing can be used in XR design to calculate how virtual objects should appear based on the user's viewpoint and the properties of the physical environment. When virtual objects are seamlessly integrated with the real world, it creates a more convincing and immersive XR experience. Due to the miniature nature of XR components with very tight tolerances, it is challenging not only for designing XR micro-optics and subsystems but also integrating the whole system. Small errors in manufacturing, assembling and alignment can degrade optical ray parallelism significantly in the XR system. As such, XR components and systems need to be carefully evaluated to ensure ideal optical parallelism of the final products has been achieved, enabling precise representation of virtual objects in the virtual or real world. A specialized tool capable of optical parallelism measurements with high angular accuracy is required to ensure physical light rays propagating precisely through an optical device with the required specifications during its production. The tool and related measurements are critical to finding out the root cause of any ray misalignments as well as to address related issues, e.g., manufacturing tolerances and optical alignment errors that can cause the product to not perform as designed. In addition, most advanced XR devices use waveguides or other optical components to maintain optical parallelism and to direct light to the user's eyes. Characterizing the optical properties of these guiding optics can help to ensure that virtual rays remain physically parallel to the user's line of sight.

There are several optical equipment that can be used for optical ray measurements in XR metrology, e.g., an optical collimator, a wavefront sensor and a interferometer. An optical collimator can produce a parallel beam of light while measuring reflected light from a target. As such, it is very useful for optical alignment and calibration. It can also be used to directly measure incoming light rays from a device, e.g., XR device to assess the quality of beam collimation. However, the collimator has a single optical aperture and thus it can only measure a single beam of light rays, making it difficult to compare ray parallelism of two beams or light rays from different locations such as light emitted from different eye box locations. Although ray parallelism can be measured by scanning different areas depending the aperture size of the collimator, the motions involved in taking multiple measurements at different times are undesirable because the motions inevitably introduce errors. In addition, the optical collimator commonly comes with small field of view such as less than 1 degree, which is too small for XR applications.

A wavefront sensor is a device used to measure the shape and characteristics of an optical wavefront, and thus can obtain the divergence of light rays. It is a relatively new technique for using a Shack-Hartmann sensor for obtaining wavefront measurements where a 2D detector is combined with a lenslet array to allow direct wavefront measurements. These devices were developed for adaptive optics and have been widely used in optical metrology and laser diagnostics. However, Shack-Hartmann sensors have very limited spatial resolution and may not be able to accurately measure small wavefront distortions. The sensors also require to be pre-calibrated and routinely by an experienced person in order to correctly measure the optical wavefront, especially when the test environments are changed. An interferometer uses the interference of superimposed electromagnetic waves to extract the phase and intensity information from an object under test. The equipment has been widely used in the measurements of microscopic displacements, refractive index changes and surface irregularities for inspections of optical components or systems in both science and industry. Similar to the wavefront sensor, it can also be used to measure optical ray parallelism. However, it is very sensitive to the changes of test environments, e.g., vibration, movement, acoustic noise, air turbulence, temperature and humidity. They also have a very small dynamic range for measurements and are suitable only for measuring small changes rather than a large range of measurements. The field of view is typically narrow as well, which limits their ability to observe larger angles. In addition, the systems can be complex and difficult to set up and maintain, requiring specialized knowledge and technical skills. As such, most interferometers are expensive and bulky, especially those that have high sensitivity and spatial resolution.

There exists a need for an optical system useful for measuring optical parallelism that is suitable for a larger field of view angle to properly cover ranges commensurate with XR devices, i.e., devices with large virtual image distances and object distances.

SUMMARY OF THE INVENTION

In accordance with the present invention, there is provided an optical system including:
  (a) an enclosure including a front end and a rear end;
  (b) a first pair of apertures configured to be disposed on a front plane on the front end of the enclosure; and
  (c) a single optical lens system disposed between the front end and the rear end of the enclosure,
wherein one of the first pair of apertures is configured to allow a first set of light rays into the enclosure through the single optical lens system to be cast on an image plane as a first spot and the other one of the first pair of apertures is configured to allow a second set of light rays into the enclosure through the single optical lens system to be cast on the image plane as a second spot, the image plane being parallel to the front plane, if the first spot is concentrically disposed with the second spot, the first set of light rays is determined to be parallelly disposed with respect to the second set of light rays, otherwise the first set of light rays is determined to not be parallelly disposed with respect to the second set of light rays.

In one embodiment, the present optical system further includes a second pair of apertures, wherein the first pair of apertures are disposed along a first axis, the second pair of apertures are disposed along a second axis and the second axis is disposed at a right angle with respect to the first axis. In one embodiment, the single optical lens system includes two singlets and two doublets and an optical path is configured to be formed in an order of a first of the two singlets, the two doublets and a second of the two singlets. In one embodiment, the image plane is an image plane of an image capture device. In one embodiment, the image capture device includes a controller configured to receive an image of the first spot and the second spot, wherein the controller is configured to determine if a total area of the first spot and the second spot is substantially one of a first area of the first spot and a second area of the second spot, the first spot is determined to be concentrically disposed with the second spot, otherwise, the first set of light rays is determined to not be parallelly disposed with respect to the second set of light rays. In one embodiment, the optical lens system further including a pair of tubes, each of the tubes includes a front end and a rear end, wherein one of the first pair of apertures is configured to be disposed at the front end of each of the tubes, each of the tubes is configured to be removably coupled at the rear end of each of the tubes to the enclosure at the front plane. In one embodiment, at least one of the first set of light rays and the second set of light rays includes a cross-hair shape such that an angular deviation of the first set of light rays or the second set of light rays is discernible. In one embodiment, the single optical lens system is configured to be telecentric. In one embodiment, the first set of light rays and the second set of rays are emitted from a device under test having virtual imaging distances or object distances ranging from at least +/−6D to infinity. In one embodiment, a size of each of the first pair of apertures is configured to be alterable.

An object of the present invention is to provide an apparatus useful for measuring optical parallelism in extended reality (XR) metrology.

Another object of the present invention is to provide an apparatus useful for measuring optical parallelism in extended reality (XR) metrology using a single optical lens system.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 8 is a table listing a partial exemplary set of optical data suitable to form the single lens system shown in FIG. 7.

FIG. 9 is a table depicting aperture sizes, interpupillary distances (IPDs) and broad virtual imaging distance (VID) ranges, under which the single lens system has a diffraction-limited performance.

FIG. 10 is a front side perspective view of another embodiment of a present optical system.

FIG. 11 is a diagram depicting the front face of the optical system shown in FIG. 10.

FIG. 12A is a table depicting the size of images cast through the present lens system despite different VIDs.

FIGS. 27-28 are diagrams depicting the lateral color of the present single lens system for apertures ranging from 5 mm to 2 mm.

FIG. 29 is a diagram depicting the longitudinal aberration and focus shift of the present single lens system.

FIG. 30 is a diagram depicting the field curvature and distortion of the present single lens system.

PARTS LIST

2—optical system, e.g., optical parallelism metrology device
4—first axis
6—second axis 8—controller
10—waveguide
12—aperture
14—optical exit port to image plane
16—enclosure
18—angular offset
20—ideally-aligned beams
22—misaligned beam
24—focal distance
26—imaging circle
28—image plane
30—single optical lens system
32—light rays
34—redirected light rays
36—device under test (DUT)
38—camera
40—front plane

PARTICULAR ADVANTAGES OF THE INVENTION

In the present optical system, at least two apertures are provided for light rays of a device under test (DUT) to be sampled. By contrast, conventional optical systems generally come with one entrance pupil or one stop in an imaging system. Further, some conventional optical systems use beam splitters or more than one lens system to combine two beams, a practice that is undesirable as it inevitably introduces optical alignment errors as well as mechanical stability issues. The present optical system utilizes a single optical lens system to ensure the absolute accuracy of parallelism measurements. The present optical system includes a diffraction-limited angular offset sufficient to provide the highest angular accuracy capable of discerning slight angular and boresight deviations. The present optical system involves telecentric imaging which enables an image size received at an image plane that remains unchanged when different object distances or virtual imaging distances (VIDs) of a DUT, are used. The present optical system is suitable for use with long VID ranges or object distances ranging from at least +/−6D to infinity and further includes field of view angles of at least about 5 degrees to cover a proper angular range. As the present optical system is compact and lightweight, it is suitable for extended reality (XR) applications. It can be used for XR metrology to evaluate the optical parallelism of any devices or systems that produce virtual images, including holographic waveguides, light engines or micro-display modules, full XR glasses and systems and head-up display (HUD) systems. The entrance pupils can be virtual ones, e.g., those provided by an XR-related DUT where the present optical system automatically adapts to the DUT's pupils in both size and location.

Detailed Description of a Preferred Embodiment

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
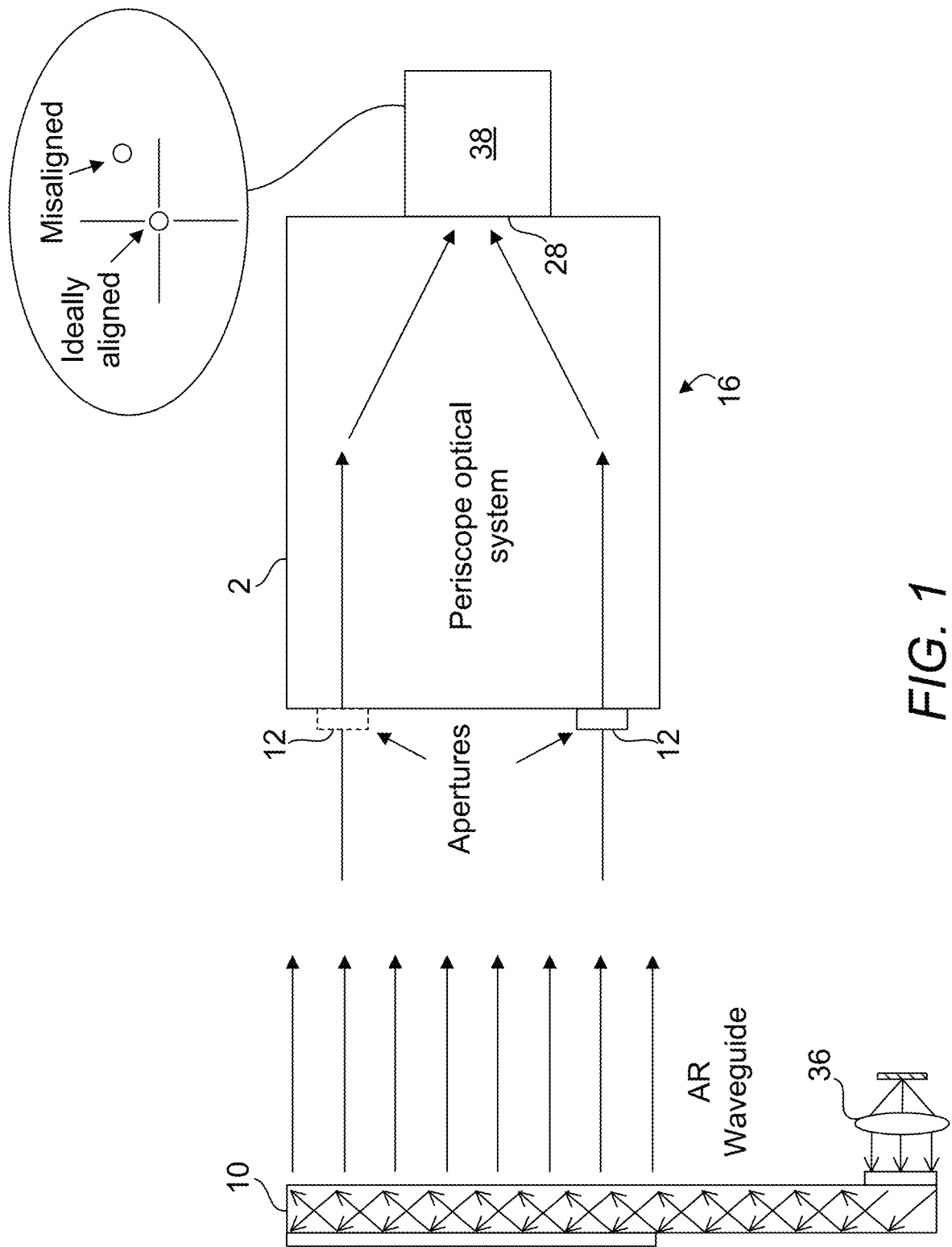
FIG. 1 is a conceptual diagram depicting a present optical system useful for measuring parallelism of light rays from a device under test, e.g., an augmented reality (AR) waveguide.
Figure 2:
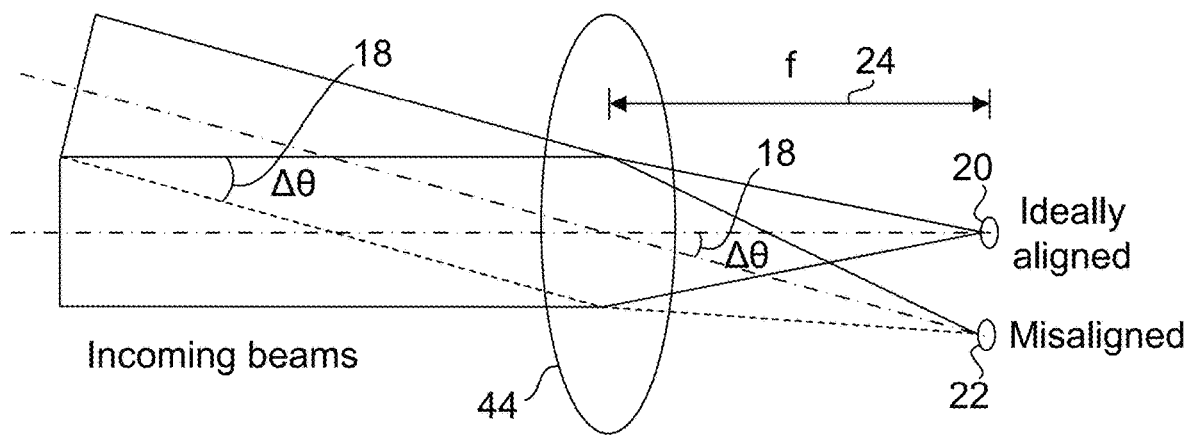
FIG. 2 is a diagram depicting ideally aligned and misaligned beams and the parameters related to a misalignment calculation.
Figure 3:
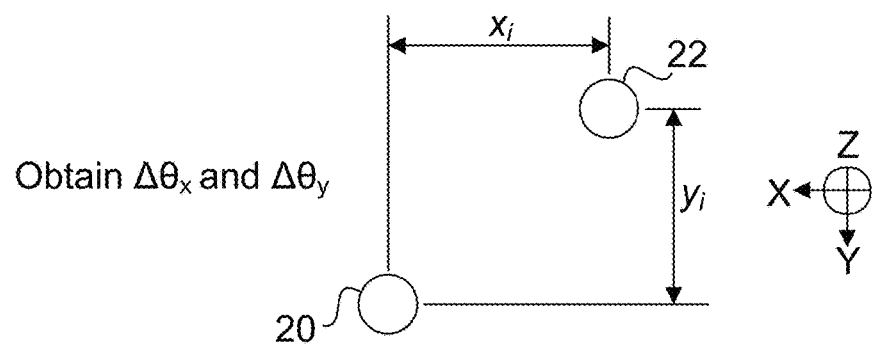
FIG. 3 is a diagram depicting a misaligned spot formed as a result of a misalignment of a first set of rays in relation to a second set of rays.

FIG. 1 is a conceptual diagram depicting a present optical system 2 useful for measuring parallelism of light rays from a device under test (DUT) 36, via a device, e.g., an augmented reality (AR) waveguide 10. In one embodiment, the DUT is both the device shown as part 36 and waveguide 10. The periscope-like optical system can be used to select the optical rays from different areas of interest or different eye-box locations and then compare them to discern any angular or boresight deviations. FIG. 2 is a diagram depicting ideally aligned and misaligned beams and the parameters related to a misalignment calculation. FIG. 3 is a diagram depicting a misaligned spot formed as a result of a misalignment of a first set of rays in relation to a second set of rays, an image of which can be obtained through a camera 38 as shown in FIG. 1. Ideally, all optical rays are aligned parallelly when the virtual distance is at infinity. In this case, only one spot will be observed on an image plane 28, e.g., of a camera 38 sensor, as the spot shown as part 20 in both FIGS. 2 and 3. If two spots, i.e., spots 20 and 22, are observed, the two sampled beams are not parallel. Their angular deviation can be calculated based on beam shifts. The angular shift/offset/Δθ 18 of an optical system 2 is dependent on the diameter of its optical aperture 12, i.e., D and the wavelength λ of the light rays:

$$\delta\theta = 1.22\lambda/D, \text{ which is diffraction-limited.}$$

For example, for λ=wavelength of light rays=500 nm and D=5 mm, δθ=angular resolution=1.22×10$^{-4}$ rad≈0.007 degrees The magnitude of misalignment can be calculated as follows:

The two collimated beams through the apertures disposed at different angles, are focused at different locations on the image plane 38. The angular shift of incident light beam can be described as follows, where Δθx=angular shift along the x-axis, Δθy=angular shift along the y-axis, $x_i$=spatial shift along the x-axis on the image plane, $y_i$=spatial shift along the y-axis on the image plane and f=focal length of the lens system.

$$\Delta\theta x = \tan^{-1}(x_i/f)$$

$$\Delta\theta y = \tan^{-1}(y_i/f)$$

The angular offset needs to be diffraction-limited to ensure the effective detection of any possible misaligned optical rays. The diffraction-limited angular offset of the present optical system provides the highest angular accuracy capable of discerning slight angular and boresight deviations. The optical system 2 includes an enclosure 16, a first pair of apertures 12 and a single lens system 30. The enclosure 16 includes a front end and a rear end. The first pair of apertures 12 is configured to be disposed on a front plane 40 on the front end of the enclosure. The single optical lens system 30 is disposed between the front end and the rear end of the enclosure. The first pair of apertures 12 is configured to allow a first set of light rays into the enclosure 16 through the single optical lens system to be cast on an image plane 28, e.g., one that is disposed on the rear end of the enclosure or one that is disposed downstream from the rear end of the enclosure, as a first spot. The other one of the first pair of apertures 12 is configured to allow a second set of light rays into the enclosure 16 through the single optical lens system 30 to be cast on the image plane 28 as a second spot, the image plane 28 being parallel to the front plane. If the first spot is concentrically disposed with the second spot to form spot 20, the first set of light rays is determined to be parallelly disposed with respect to the second set of light rays. Otherwise, the first set of light rays is determined to not be parallelly disposed with respect to the second set of light rays. This determination can be performed manually, e.g., by analyzing the size of a spot or the location of a spot relative to the other spot. If the overlapped spot is of substantially the size of either one of the first spot and the second spot, the two spots are said to be concentrically disposed.

Figure 4:
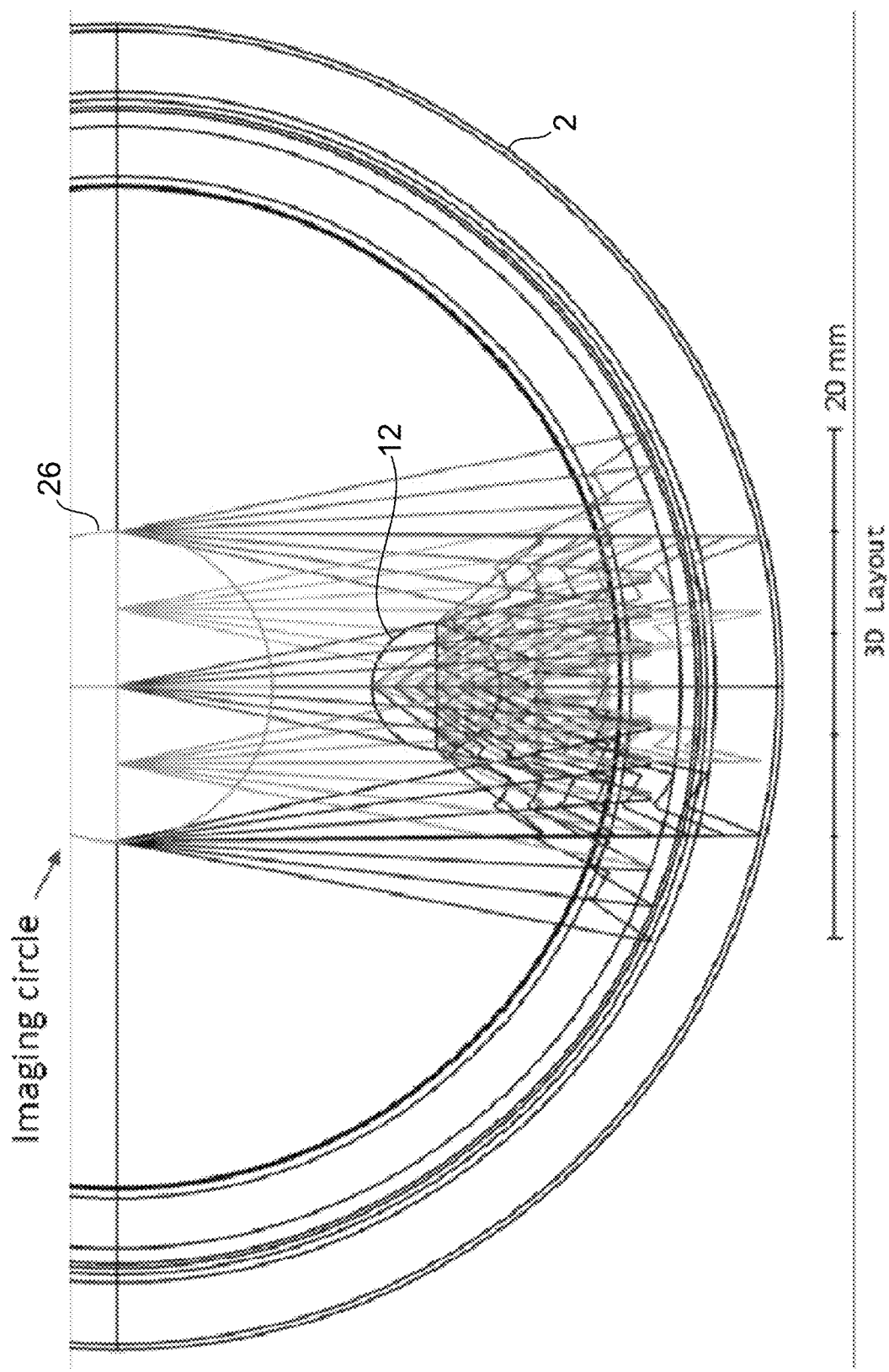
FIG. 4 is a diagram depicting the maximum width of a rays bundle which dictates the minimum width of a present optical system.
Figure 5:
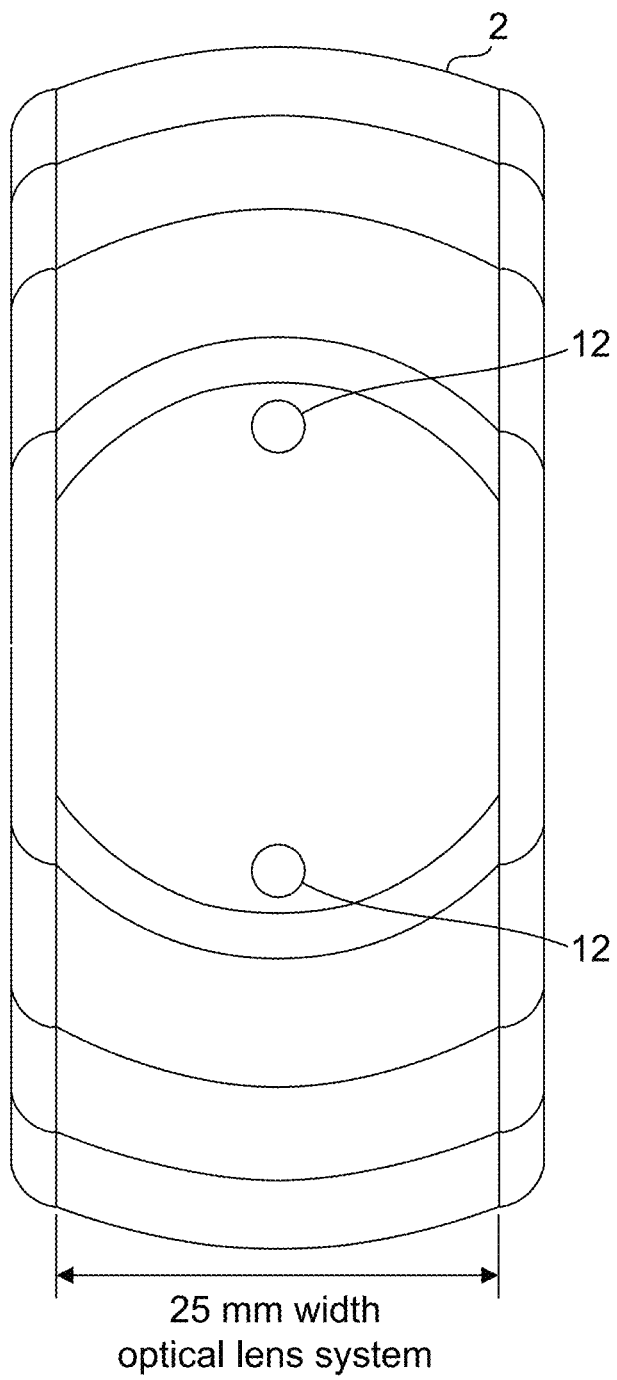
FIG. 5 is a front view of a present optical system, depicting a form factor of the present optical system sufficient to enclose the rays bundle shown in FIG. 4.

FIG. 4 is a diagram depicting the maximum width, e.g., about 20 mm, of a rays bundle which dictates the minimum width of a present optical system 2. Note that a set of rays enters the optical system 2 through aperture 12 before being disposed through the single lens system and eventually cast within in imaging circle 26 on an image plane 28. FIG. 5 is a front view of a present optical system 2, depicting a form factor of the present optical system sufficient to enclose the rays bundle shown in FIG. 4, with a width of about 25 mm, to accommodate the rays bundle. Therefore, the single lens system 30 can be cut into about 25-mm width to reduce the overall dimension of the periscope design as shown in FIG. 5.

Figure 6:
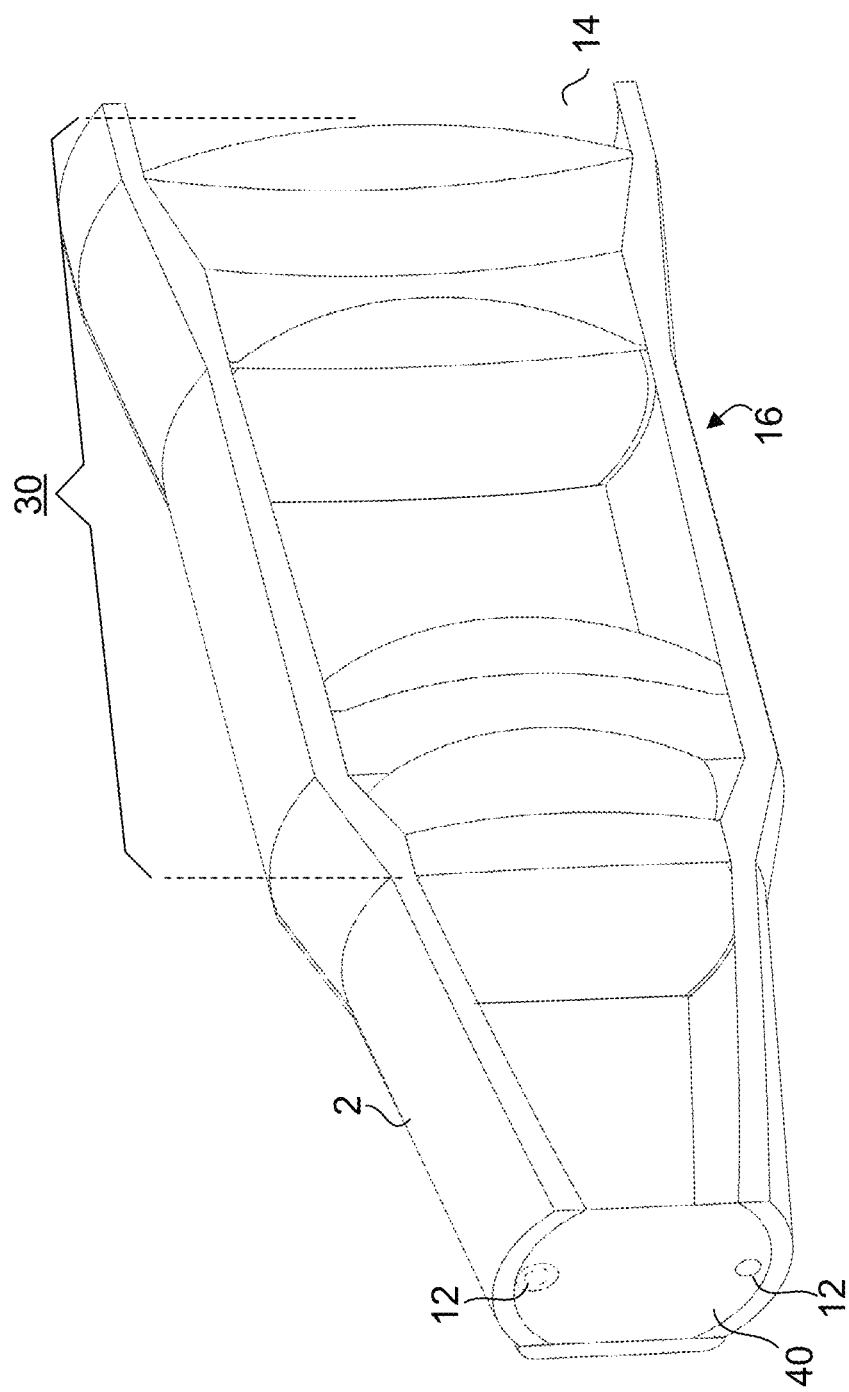
FIG. 6 is a partial front side perspective view of a present optical system, depicting an example of the single lens system suitable for focusing a first set of rays and a second set of rays on an image plane of the present optical system.
Figure 7:
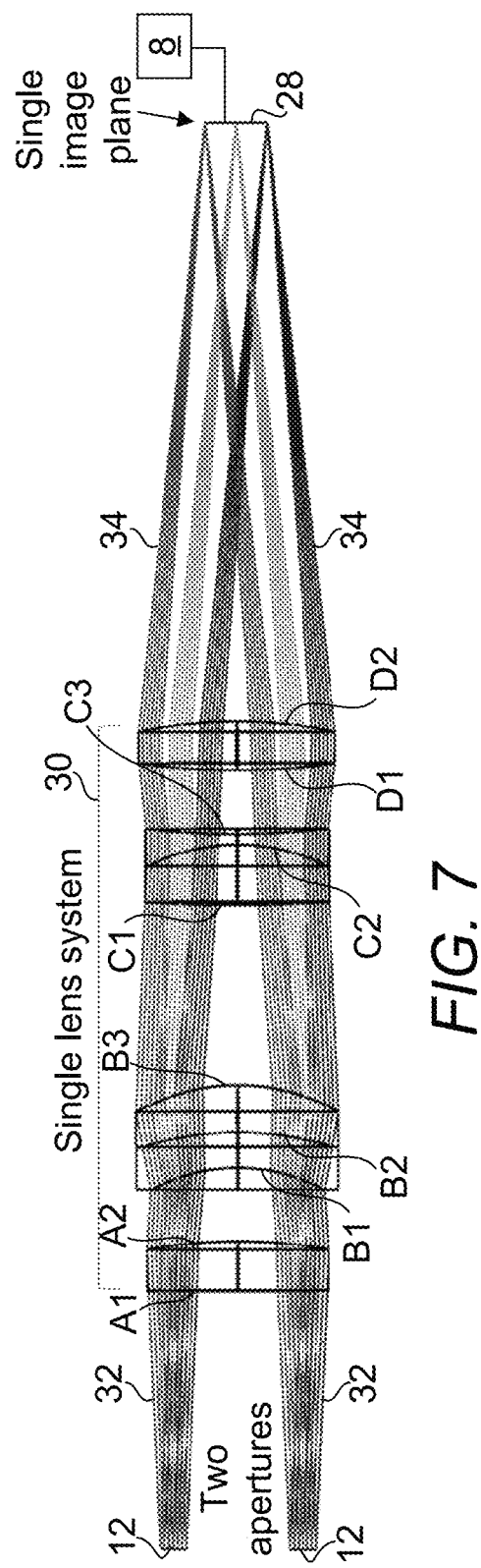
FIG. 7 is a diagram depicting the optical paths through the two apertures disposed on the front face and a single lens system of a present optical system.

FIG. 6 is a partial front side perspective view of a present optical system 2, depicting an example of the single lens system 30 suitable for focusing a first set of rays 32 and a second set of rays 32 on an image plane of the present optical system 2. FIG. 7 is a diagram depicting the optical paths of light rays 32 through the two apertures 12 disposed on the front face or plane and a single lens system 30 of a present optical system. FIG. 8 is a table listing a partial exemplary set of optical data suitable to form the single lens system 30 shown in FIG. 7. FIG. 9 is a table depicting aperture sizes, interpupillary distances (IPDs) and broad virtual imaging distance (VID) ranges, under which the single lens system has a diffraction-limited performance. In the embodiment shown in FIG. 7, the single optical lens system includes two singlets and two doublets and an optical path is configured to be formed in an order of a first of the two singlets, the two doublets and a second of the two singlets. In one embodiment, the image plane is an image plane of an image capture device, e.g., camera 38. In one embodiment, the image capture device includes a controller 8 configured to receive an image of the first spot and the second spot, wherein the controller 8 is configured to determine if a total area of the first spot and the second spot is substantially one of a first area of the first spot and a second area of the second spot, the first spot is determined to be concentrically disposed with the second spot, otherwise, the first set of light rays is determined to not be parallelly disposed with respect to the second set of light rays. Essentially, if the two spots substantially overlap, i.e., the size of the aggregate spot is substantially the size of the first spot or the second spot, the aggregate spot will appear as a single spot and has an area that is about the area of the first spot or the second spot as the two spots have substantially the same area.

Two or more apertures can be placed at the front of lens system depending the test requirements of applications. For two apertures, the system can be designed as flat or pancake shape as shown in FIG. 6, which may be desirable for XR metrology due to the compactness of the XR components and systems. FIG. 10 is a front side perspective view of another embodiment of a present optical system. FIG. 11 is a diagram depicting the front face or plane 40 of the optical system shown in FIG. 10. It shall be noted that, in this embodiment, the present optical system 2 further includes a second pair of apertures 12, wherein the first pair of apertures 12 are disposed along a first axis 4, the second pair of apertures 12 are disposed along a second axis and the second axis 6 is disposed at a right angle with respect to the first axis 4. The incorporation of the second pair of apertures 12 requires that the optical system 2 to have a single lens system having a full cross-sectional area to allow propagation of the light rays entering through these additional apertures unimpeded to the image plane 28, therefore requiring an optical system that may not be truncated on two sides of the enclosure as one shown in FIGS. 5-6. The apertures can be physical ones, e.g., the apertures 12 shown throughout herein or virtual ones if the light rays emitting from a pupil or multiple individual pupils from the DUT, e.g., the RGB exit ports of AR micro-display projectors. In determining the set/s of light rays that are not parallel to previously-established parallel set/s of light rays, an aperture can be blocked at any one time to determine whether the set of light rays disposed through the aperture is one which is not parallel to the previously-established parallel set/s of light rays. In the embodiment shown, as the second pair of apertures are disposed at a right angle to the first pair of apertures, all of the apertures can be used simultaneously to determine the parallelism of light rays covering an extended area all at once, making additional samplings of light rays, e.g., by rotating the first pair of apertures, e.g., those of the two-aperture front plate, as shown in FIG. 5, 90 degrees, for a parallelism determination of light rays along the second axis 6 of FIG. 11, unnecessary.

Figure 12:
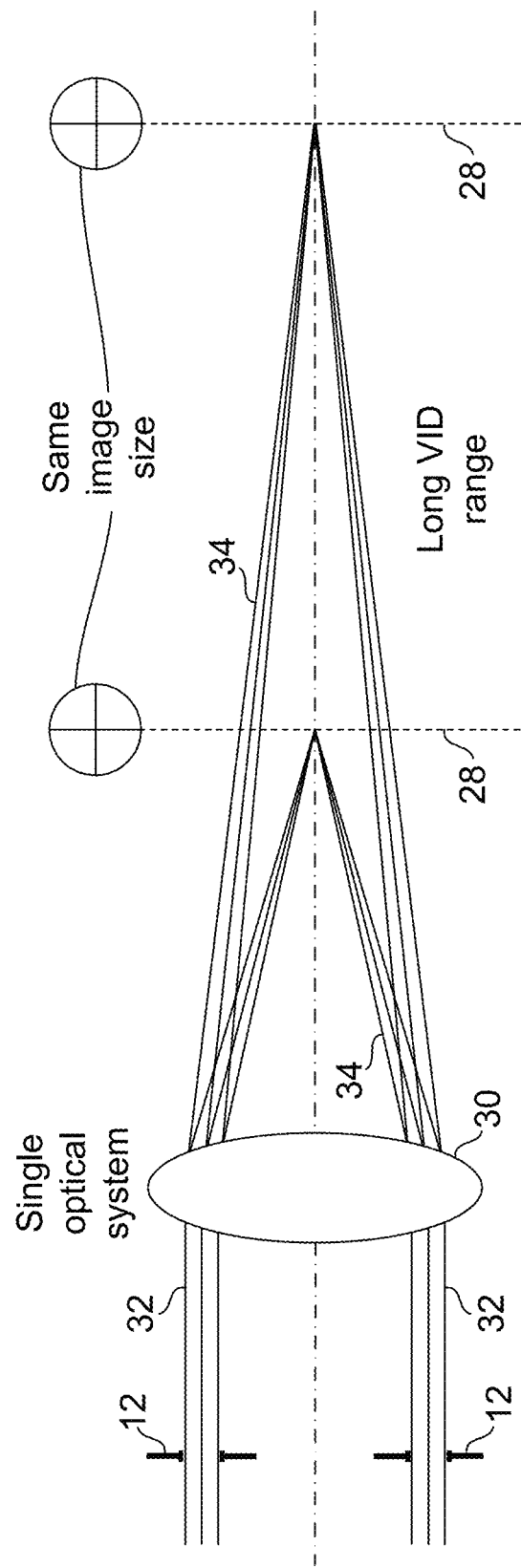
FIG. 12 is a diagram depicting the size of images cast through the present lens system despite different virtual imaging distances (VIDs).

FIG. 12 is a diagram depicting the size of images cast through the present lens system despite different virtual imaging distances (VIDs). FIG. 12A is a table depicting the size of images cast through the present lens system despite different VIDs. It shall be noted that the size (semi-diameter) of the image cast on the image plane 28 remains almost the same or unchanged, e.g., at about 12 mm in diameter, with different VIDs. Therefore, the single optical lens system is said to be configured to be telecentric against different object distances or VIDs of different devices under test. The first set of light rays and the second set of rays are emitted from a DUT having VIDs or object distances ranging from at least +/−6D to infinity. The present single lens system was found to be telecentric as well for various aperture sizes and positions. In addition to the diffraction-limited angular offset, the present optical system also has a diffraction-limited modulation transfer function (MTF) performance under various apertures, e.g., from about 2 mm to about 5 mm, i.e., apertures matching the human eye pupil size and across the long range of VIDs from at least +/−6D to infinity.

In practice, the entrance pupils/apertures can be virtual ones. A target or light rays from a DUT can be provided as a cross-hair as well as a circular spot not unlike a spot formed as a result of light rays being limited by circular apertures 12. In one embodiment, a DUT 36 is configured to project a first set of light rays and a second set of light rays each including rays disposed in a cross-hair shape such that an angular deviation of the first set of light rays or the second set of light rays is discernible as compared to circular spots. In this case, one single image in the shape of a cross-hair will be observed in on the image plane 28 if the first set of light rays is parallel with respect to the second set of light rays. Otherwise, the image will indicate a clear misaligned as the vertical and/or horizontal marks of the cross-hair will not match.

Figure 13:
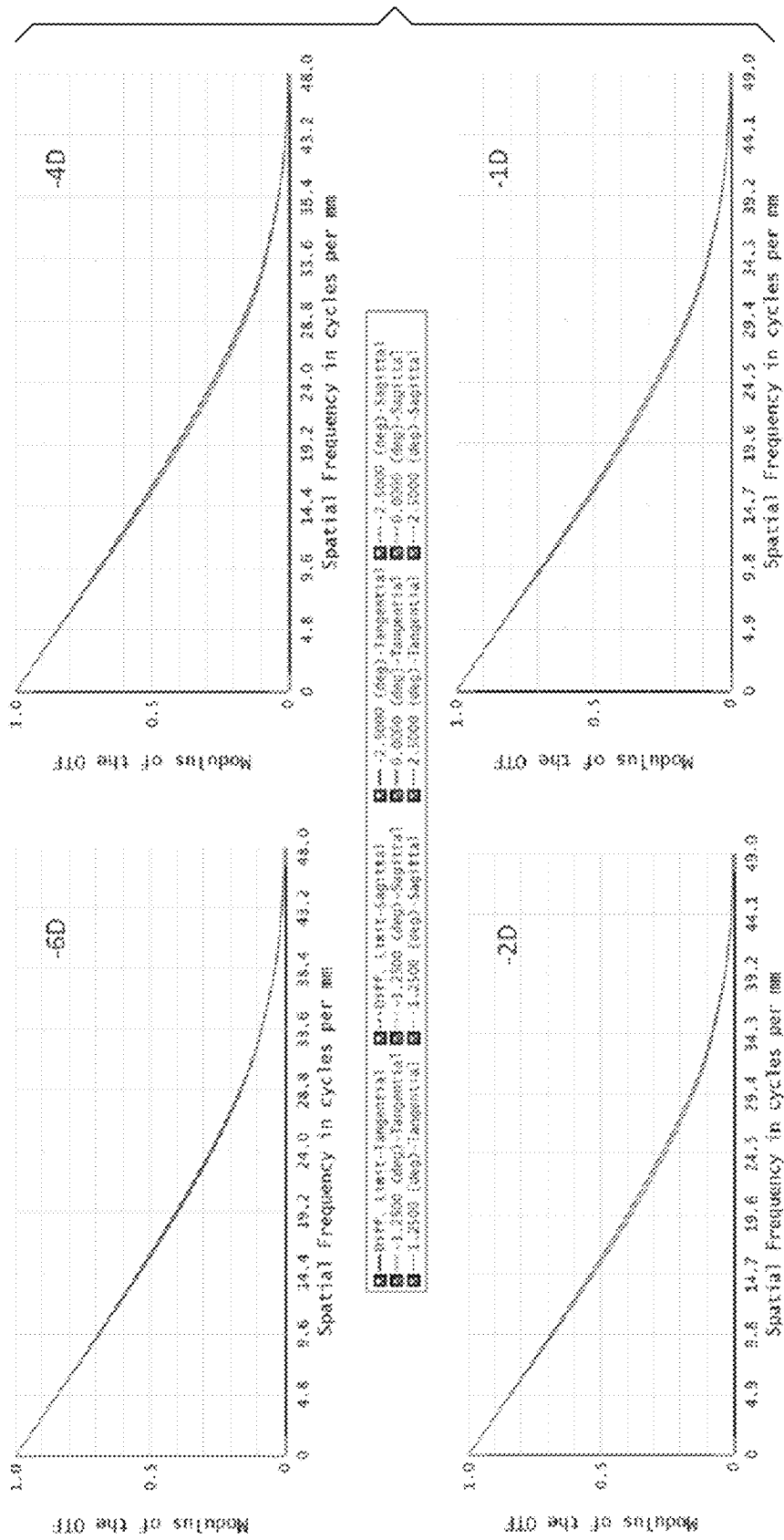
FIGS. 13-14 are diagrams depicting a present single lens system having a diffraction-limited modulation transfer function (MTF) with an aperture diameter of 3 mm for different VIDs ranging from +/−6D to 0D or from +/−166.67 mm to infinity.
Figure 14:
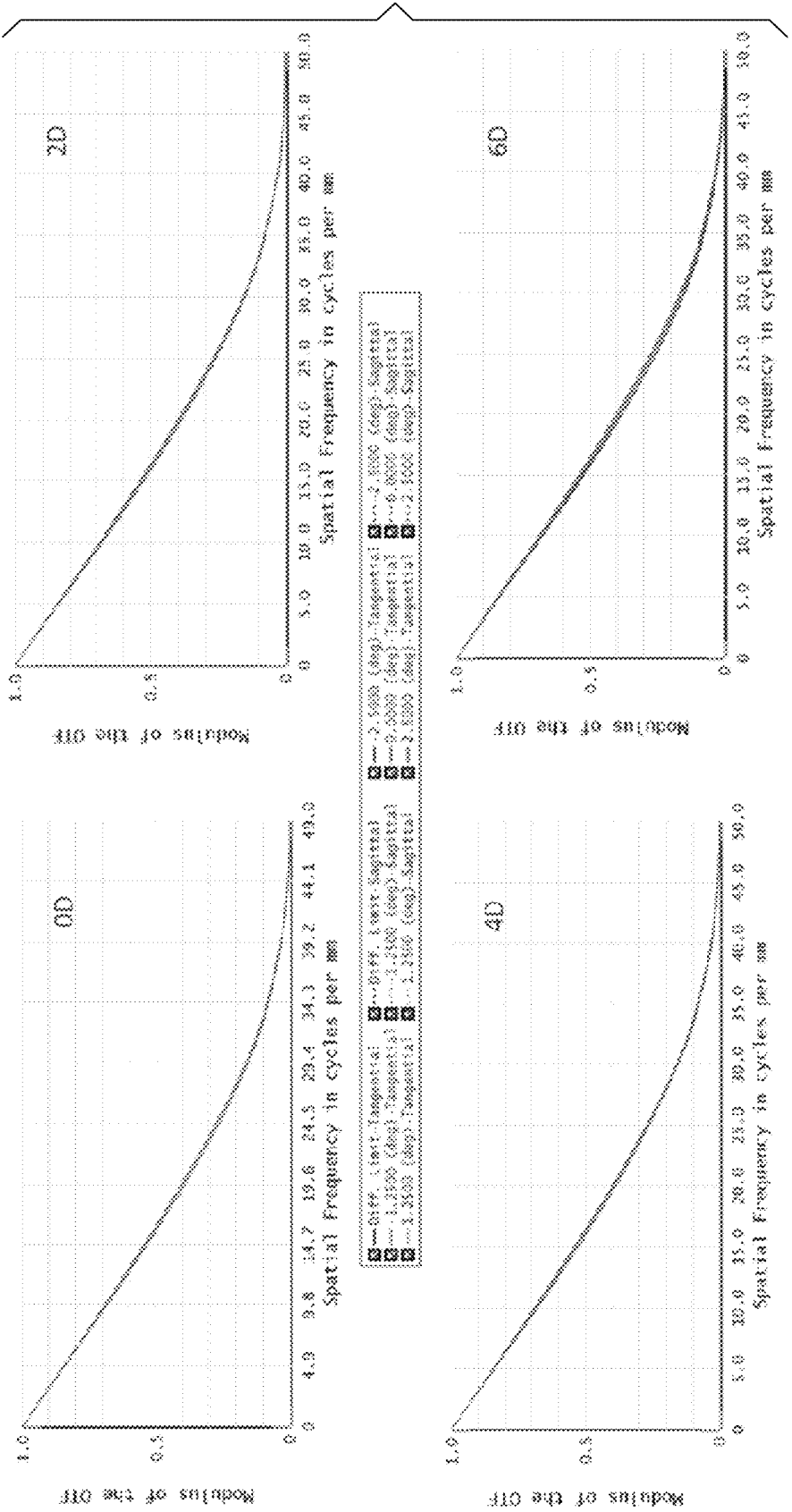
Figure 15:
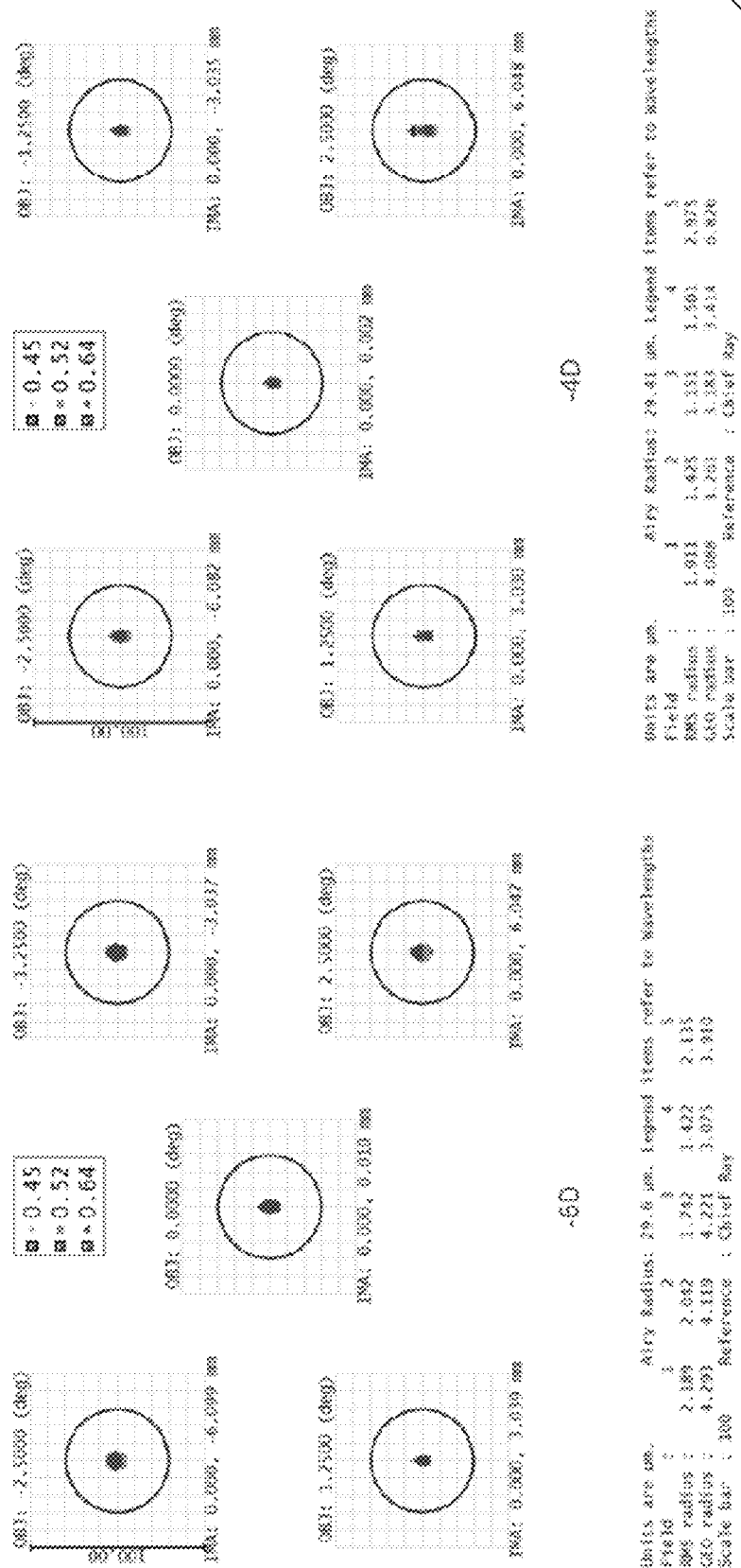
FIGS. 15-18 are spot diagrams depicting diffraction-limited performances of a present single lens system shown in FIG. 7 with a 3 mm aperture and long VID ranges or object distances from +/−6D to 0D or from +/−166.67 mm to infinity.
Figure 16:
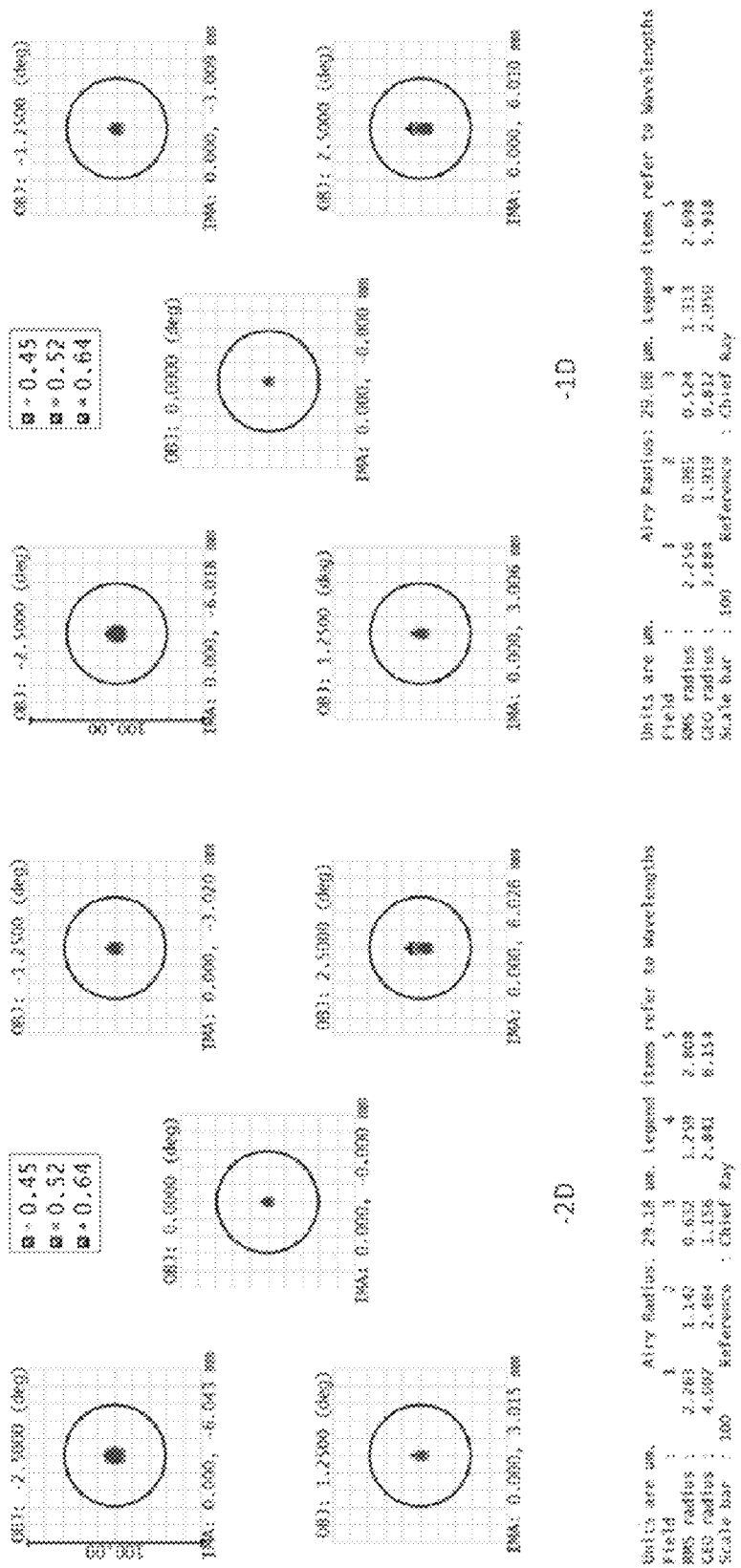
Figure 17:
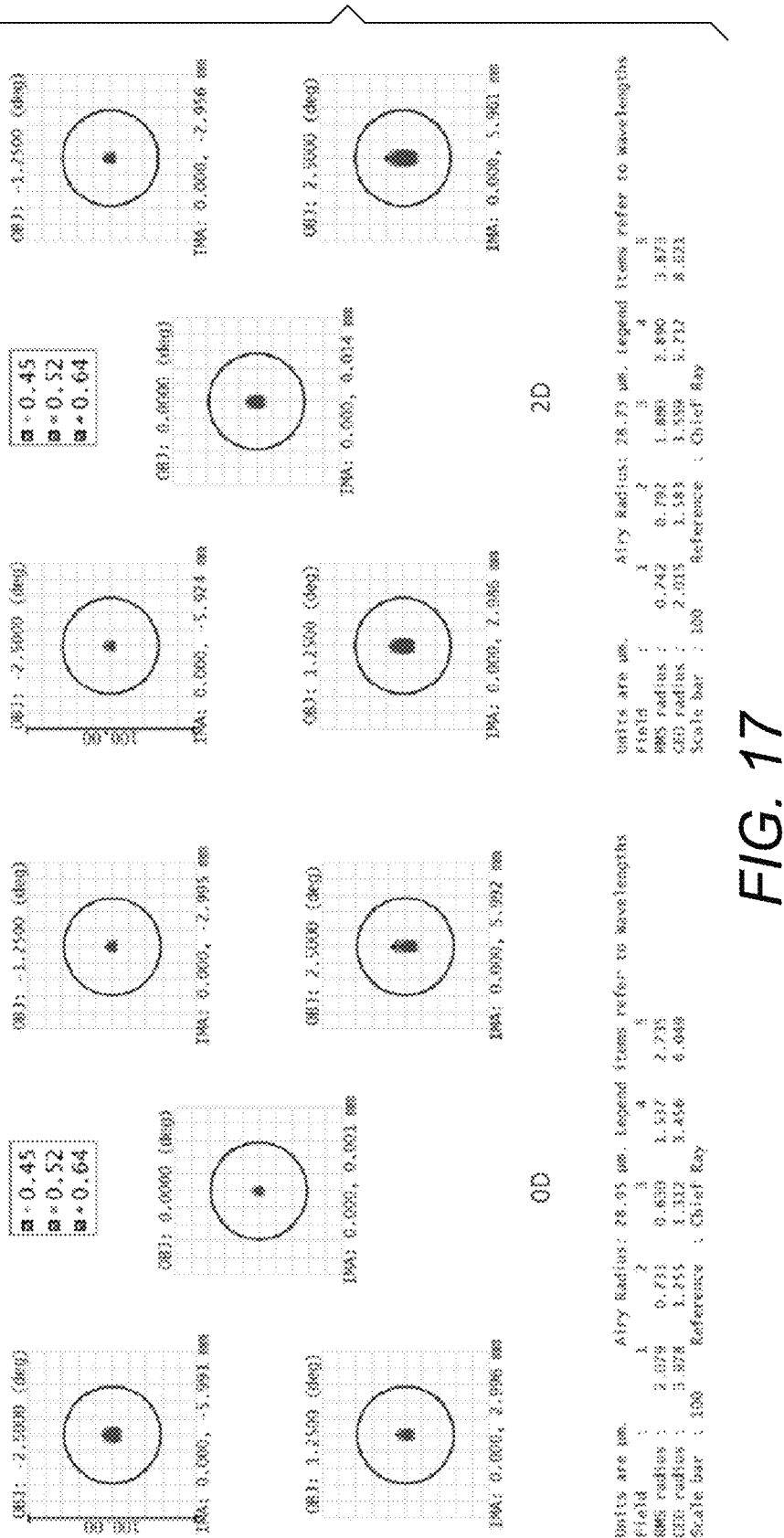
Figure 18:
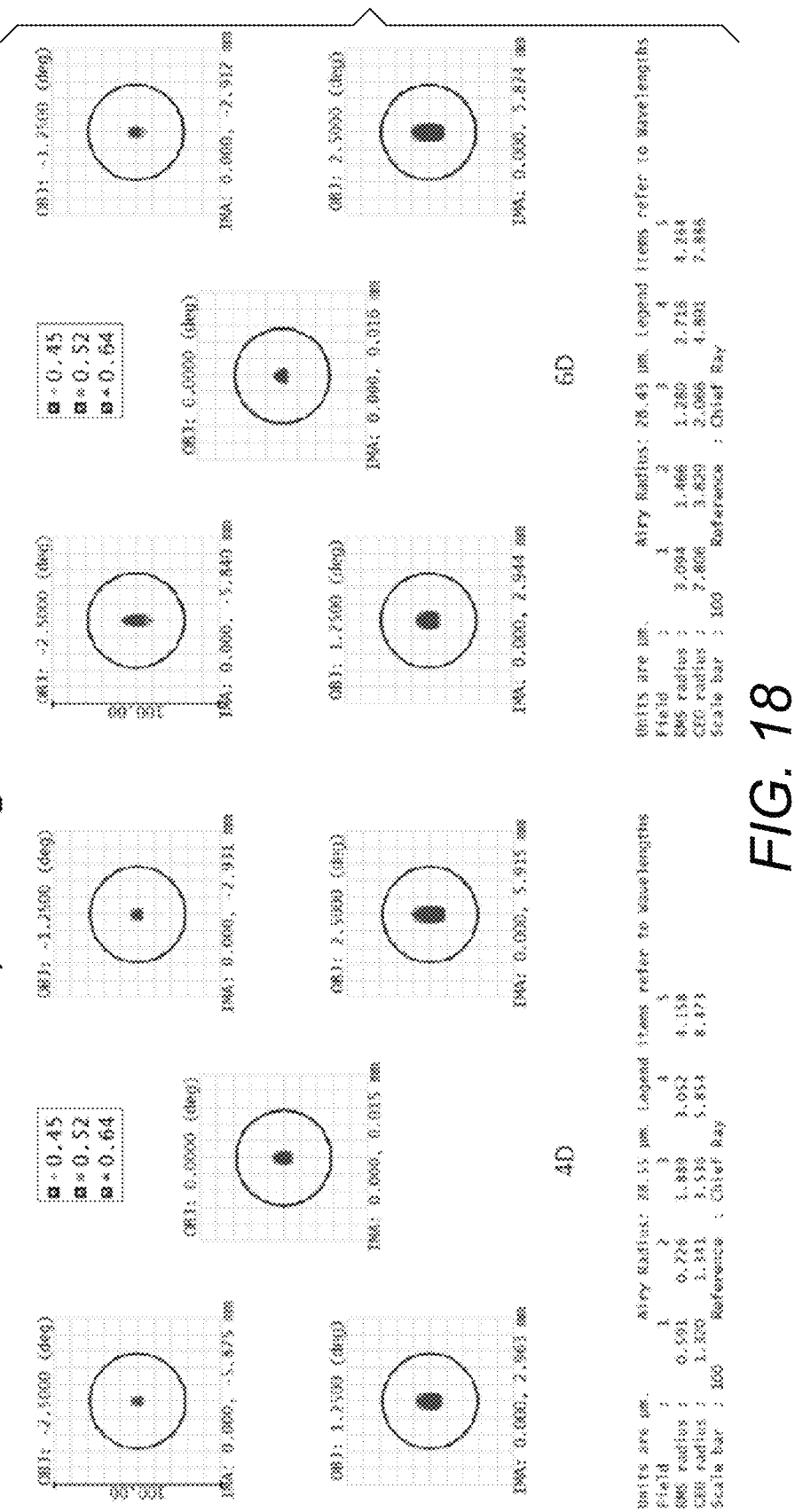

FIGS. 13-14 are diagrams depicting a present single lens system having a diffraction-limited MTF with an aperture diameter of 3 mm for different VIDs ranging from +/−6D to 0D or from +/−166.67 mm to infinity). It shall be noted that the MTF curves from different field angles are very close to or congruent with the lines representing the diffraction-limited lines of the lens system. In other words, the lens has a diffraction-limited performance across the entire field of view (FOV) as well as different VID ranges from +/−6D to 0D or from +/−166.67 mm to infinity.

FIGS. 15-18 are spot diagrams depicting diffraction-limited performances of a present single lens system shown in FIG. 7 with a 3 mm aperture and long VID ranges or object distances from +/−6D to 0D or from +/−166.67 mm to infinity.

The dark circle in each diagram is an Airy disk which is the best-focused spot of light that a perfect lens with a circular aperture can make, limited by the diffraction of light. The spot diagrams show the single lens system having a diffraction-limited performance across an FOV.

Figure 19:
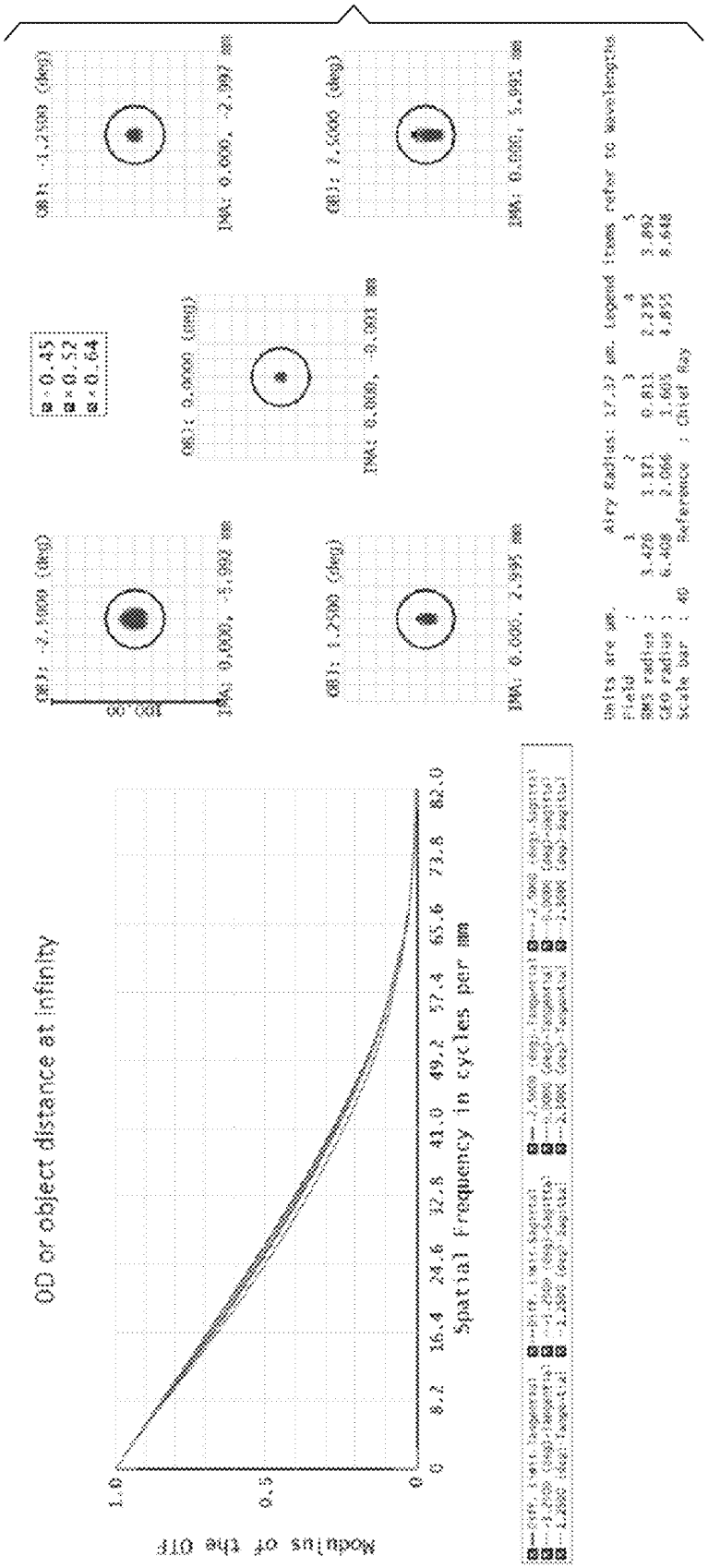
FIG. 19 shows a polychromatic diffraction MTF and spot diagram depicting the present lens system with a diffraction-limited performance at VID=0D with a 5 mm aperture.
Figure 20:
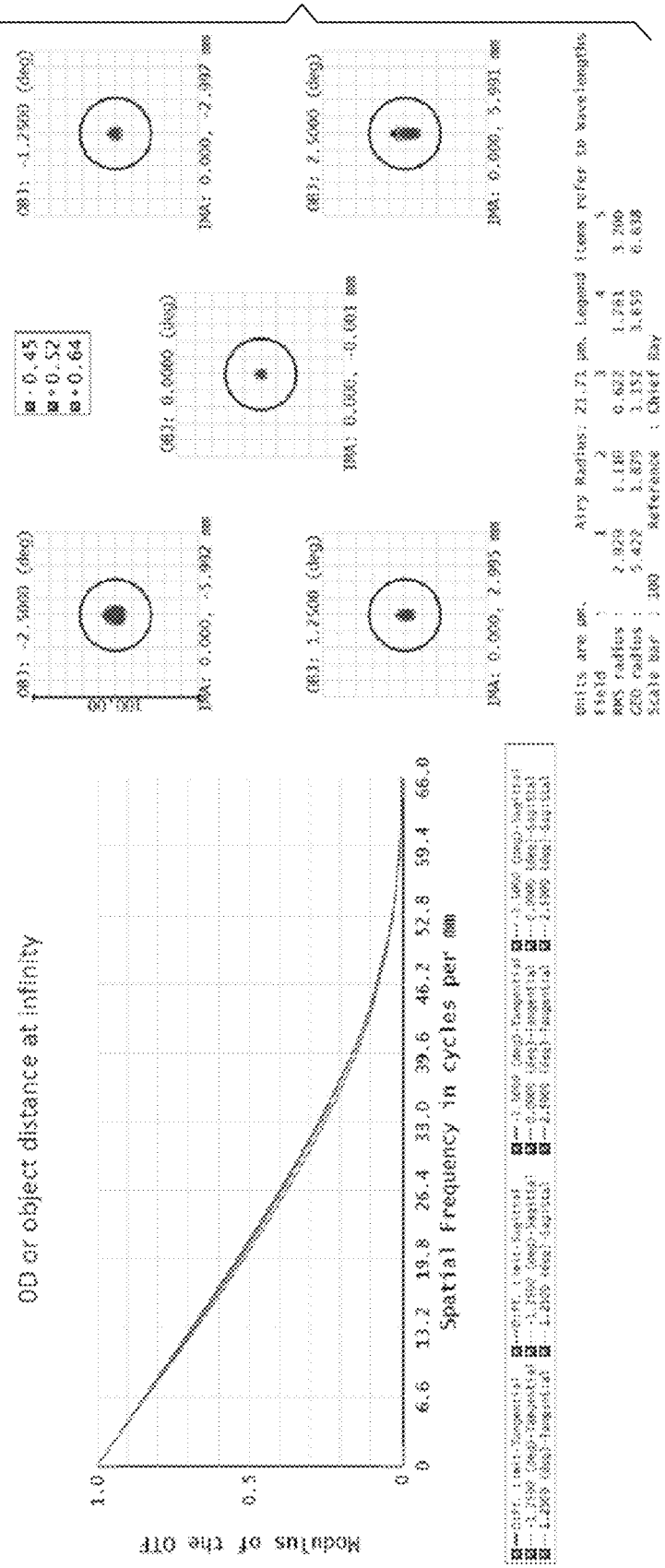
FIG. 20 shows a polychromatic diffraction MTF and spot diagram depicting the present lens system with a diffraction-limited performance at VID=0D with a 4 mm aperture.
Figure 21:
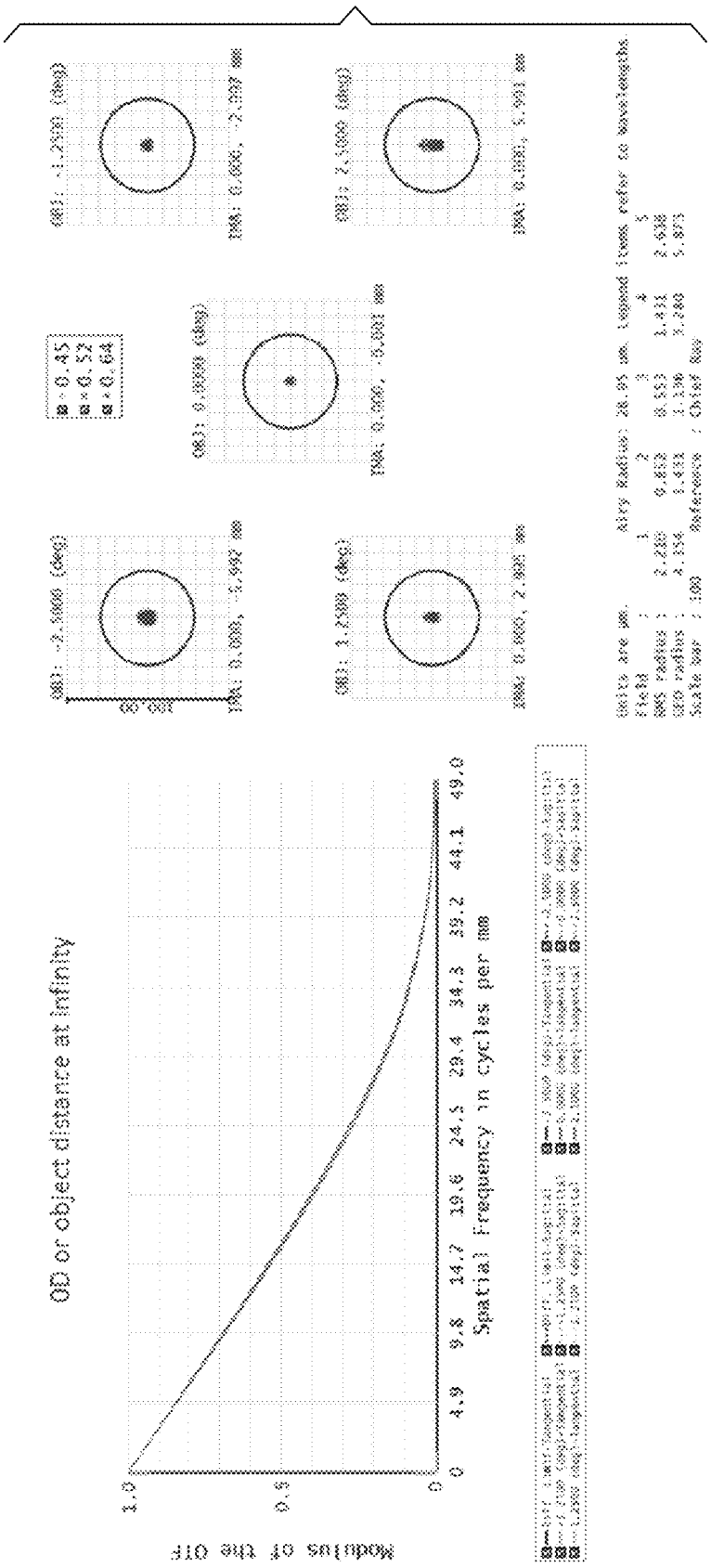
FIG. 21 shows a polychromatic diffraction MTF and spot diagram depicting the present lens system with a diffraction-limited performance at VID=0D with a 3 mm aperture.
Figure 22:
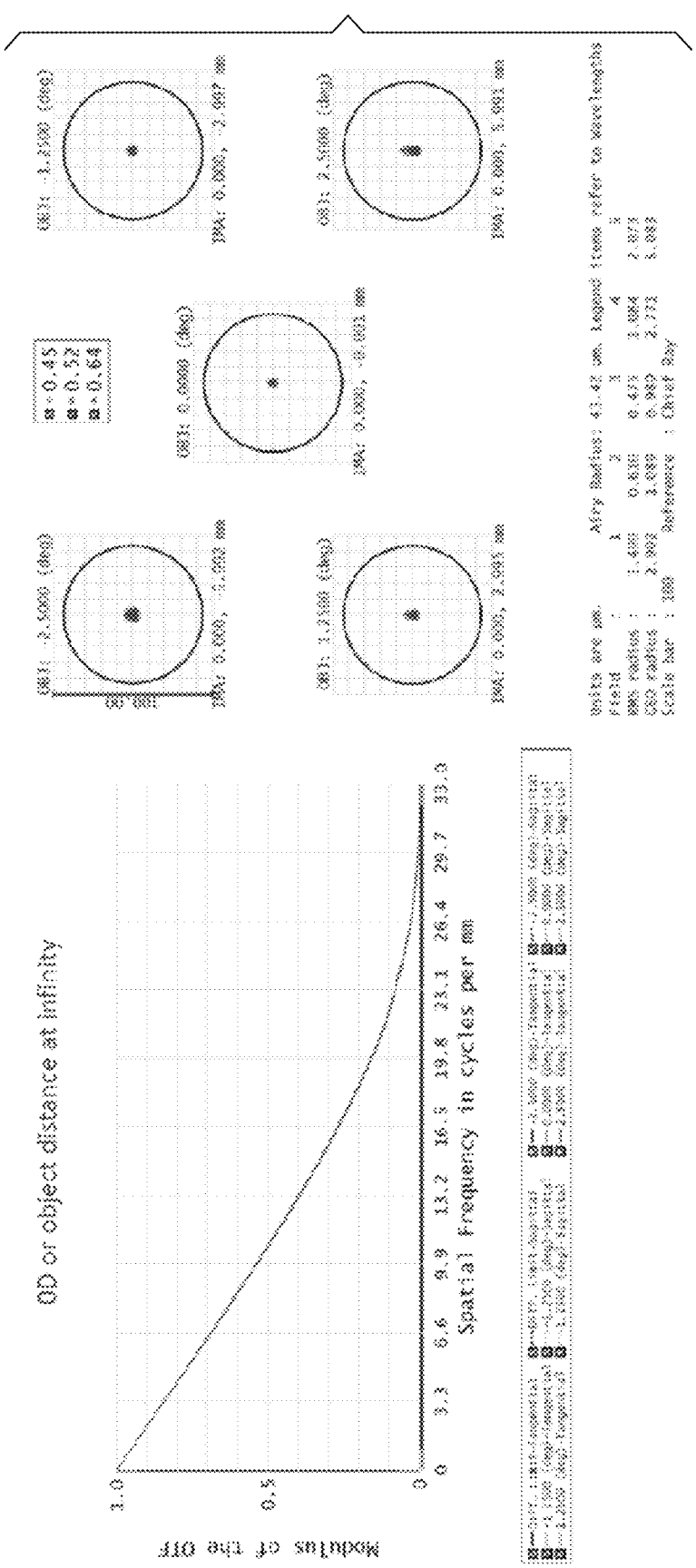
FIG. 22 shows a polychromatic diffraction MTF and spot diagram depicting the present lens system with a diffraction-limited performance at VID=0D with a 2 mm aperture.
Figure 23:
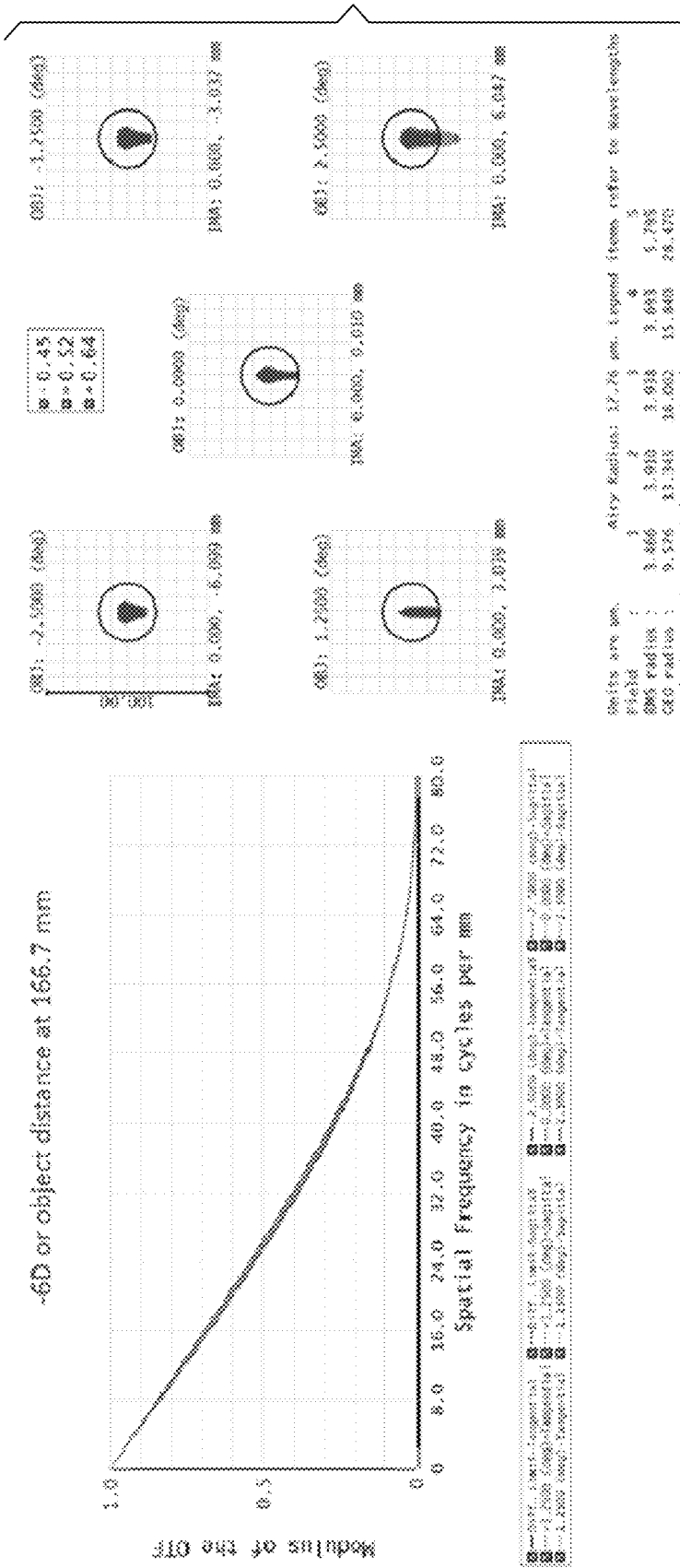
FIG. 23 shows a polychromatic diffraction MTF and spot diagram depicting the present lens system with a diffraction-limited performance at VID=−6D with a 5 mm aperture.
Figure 24:
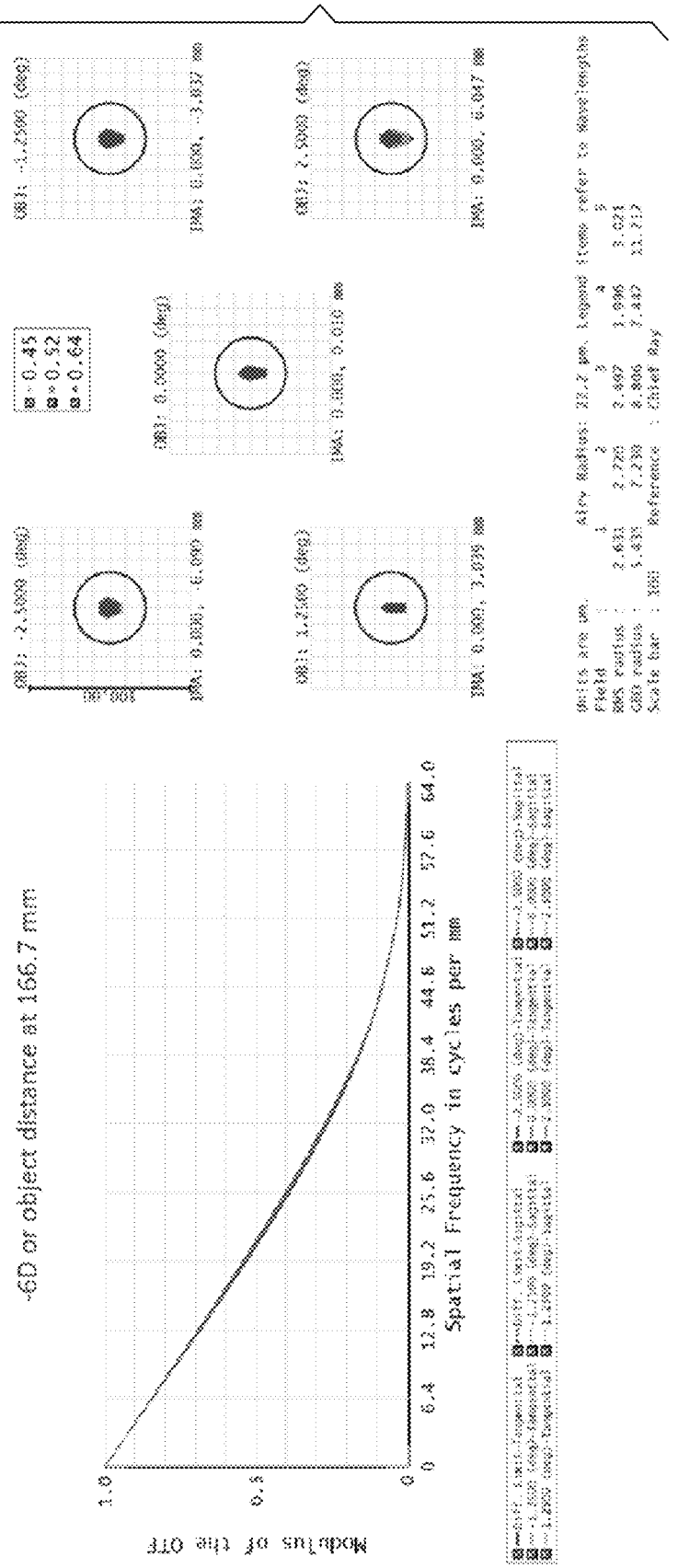
FIG. 24 shows a polychromatic diffraction MTF and spot diagram depicting the present lens system with a diffraction-limited performance at VID=−6D with a 4 mm aperture.
Figure 25:
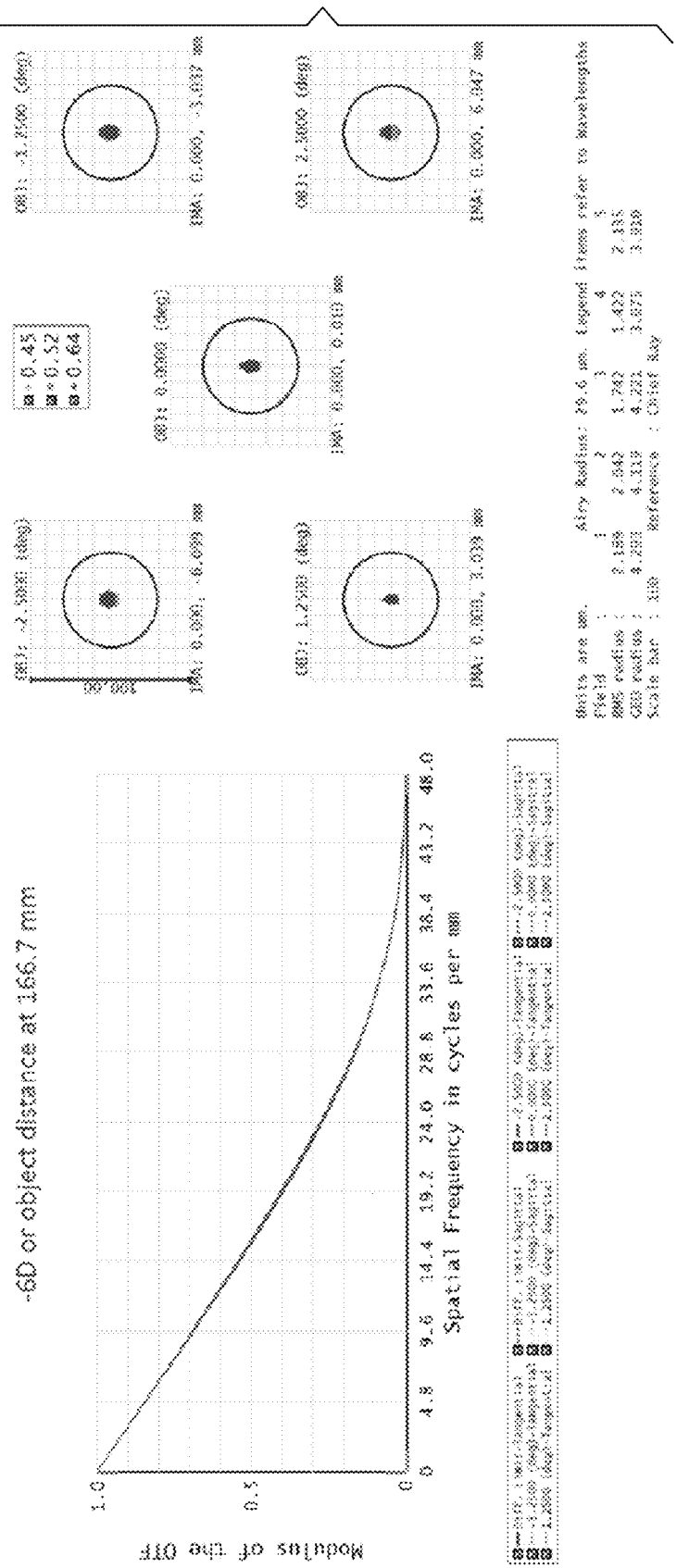
FIG. 25 shows a polychromatic diffraction MTF and spot diagram depicting the present lens system with a diffraction-limited performance at VID=−6D with a 3 mm aperture.
Figure 26:
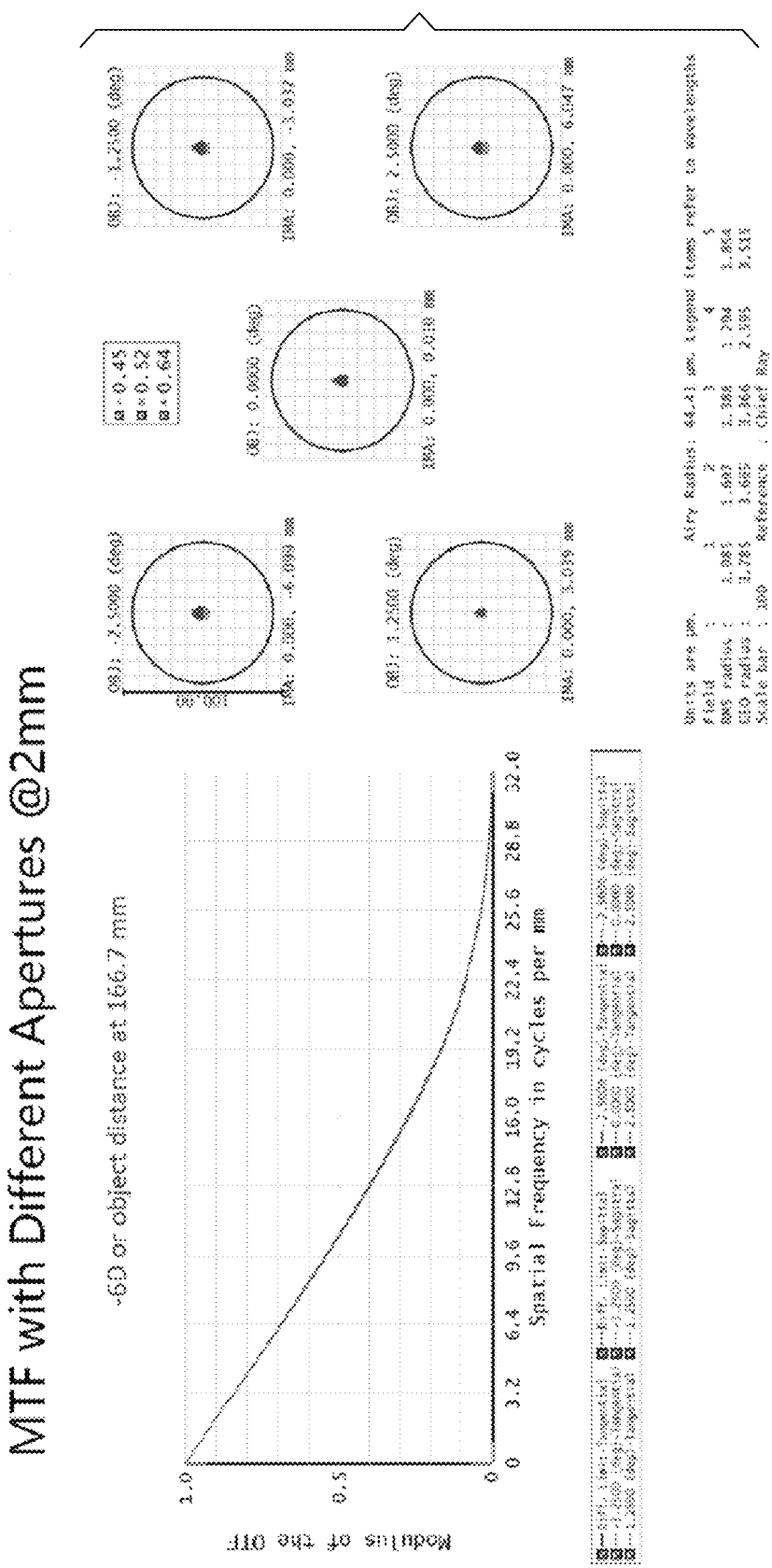
FIG. 26 shows a polychromatic diffraction MTF and spot diagram depicting the present lens system with a diffraction-limited performance at VID=−6D with a 2 mm aperture.

FIG. 19 shows a polychromatic diffraction MTF and spot diagram depicting the present lens system with a diffraction-limited performance at VID=0D with a 5 mm aperture. FIG. 20 shows a polychromatic diffraction MTF and spot diagram depicting the present lens system with a diffraction-limited performance at VID=0D with a 4 mm aperture. FIG. 21 shows a polychromatic diffraction MTF and spot diagram depicting the present lens system with a diffraction-limited performance at VID=0D with a 3 mm aperture. FIG. 22 shows a polychromatic diffraction MTF and spot diagram depicting the present lens system with a diffraction-limited performance at VID=0D with a 2 mm aperture. FIG. 23 shows a polychromatic diffraction MTF and spot diagram depicting the present lens system with a diffraction-limited performance at VID=−6D with a 5 mm aperture. FIG. 24 shows a polychromatic diffraction MTF and spot diagram depicting the present lens system with a diffraction-limited performance at VID=−6D with a 4 mm aperture. FIG. 25 shows a polychromatic diffraction MTF and spot diagram depicting the present lens system with a diffraction-limited performance at VID=−6D with a 3 mm aperture. FIG. 26 shows a polychromatic diffraction MTF and spot diagram depicting the present lens system with a diffraction-limited performance at VID=−6D with a 2 mm aperture. FIGS. 27-28 are diagrams depicting the lateral color of the present single lens system for apertures ranging from 5 mm to 2 mm. Lateral color is well controlled within the diffraction limits across all VIDs and apertures.

FIG. 29 is a diagram depicting the longitudinal aberration and focus shift of the present single lens system. The longitudinal aberration is small compared to the long depth of focus. Also, the measurements are normally conducted with single RGB colors in the XR metrology, so the longitudinal aberration is not an issue. FIG. 30 is a diagram depicting the field curvature and distortion of the present single lens system. Considering the long depth of focus, the field curvature is not an issue and the distortion is negligible.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed is:

1. An optical system comprising:
   (a) an enclosure comprising a front end and a rear end;
   (b) a first pair of apertures configured to be disposed on a front plane on said front end of said enclosure; and
   (c) a single optical lens system disposed between said front end and said rear end of said enclosure,
   wherein a first aperture of said first pair of apertures is configured to allow a first set of light rays into said enclosure to enter through a front face of said single optical lens system and to exit through a rear face of said single optical lens system to be cast on an image plane as a first spot and a second aperture of said first pair of apertures is configured to allow a second set of light rays into said enclosure to enter through the front face of said single optical lens system and to exit through the rear face of said single optical lens system to be cast on the image plane as a second spot, the image plane being parallel to said front plane and wherein a parallelism of the first set of light rays with respect to the second set of light rays is based on the concentricity of the first spot with respect to the second spot.

2. The optical system of claim 1, further comprising a second pair of apertures, wherein said first pair of apertures are disposed along a first axis, said second pair of apertures are disposed along a second axis and said second axis is disposed at a right angle with respect to said first axis.

3. The optical system of claim 1, wherein said single optical lens system comprises two singlets and two doublets and an optical path is configured to be formed in an order of a first of said two singlets, said two doublets and a second of said two singlets.

4. The optical system of claim 1, wherein said image plane is an image plane of an image capture device.

5. The optical system of claim 4, said image capture device comprises a controller configured to receive an image of said first spot and said second spot, wherein said controller is configured to determine if a total area of said first spot and said second spot is substantially one of a first area of said first spot and a second area of said second spot, the first spot is determined to be concentrically disposed with the second spot, otherwise, the first set of light rays is determined to not be parallelly disposed with respect to the second set of light rays.

6. The optical system of claim 1, at least one of said first set of light rays and said second set of light rays comprises a cross-hair shape such that an angular deviation of said first set of light rays or said second set of light rays is discernible.

7. The optical system of claim 1, wherein said single optical lens system is configured to be telecentric.

8. The optical system of claim 1, wherein the first set of light rays and the second set of rays are emitted from a device under test having virtual imaging distances or object distances ranging from at least +/−6D to infinity.

9. The optical system of claim 1, wherein a size of each of said first pair of apertures is configured to be alterable.

\* \* \* \* \*